US010310496B2

(12) United States Patent
Piety et al.

(10) Patent No.: US 10,310,496 B2
(45) Date of Patent: Jun. 4, 2019

(54) SYSTEMS AND METHODS FOR COMMUNICATING IN A PREDICTIVE MAINTENANCE PROGRAM USING REMOTE ANALYSTS

(71) Applicant: Azima Holdings, Inc., Woburn, MA (US)

(72) Inventors: Kenneth Ralph Piety, Knoxville, TN (US); K. C. Dahl, Bainbridge Island, WA (US)

(73) Assignee: Azima Holdings, Inc., Woburn, WA (US)

( * ) Notice: Subject to any disclaimer, the term of this patent is extended or adjusted under 35 U.S.C. 154(b) by 922 days.

(21) Appl. No.: 13/761,998

(22) Filed: Feb. 7, 2013

(65) Prior Publication Data
US 2014/0222378 A1 Aug. 7, 2014

(51) Int. Cl.
*G05B 23/02* (2006.01)
(52) U.S. Cl.
CPC ................ *G05B 23/0283* (2013.01)
(58) Field of Classification Search
CPC .................... G05B 23/02; G05B 23/0283
See application file for complete search history.

(56) References Cited

U.S. PATENT DOCUMENTS

| 5,661,816 | A * | 8/1997 | Fantone | G01M 11/0242 382/100 |
| 5,907,491 | A * | 5/1999 | Canada | G01H 1/003 340/3.1 |
| 6,611,755 | B1 * | 8/2003 | Coffee | B28C 5/422 340/438 |
| 7,853,551 | B1 * | 12/2010 | Gill | G06Q 10/06 706/55 |
| 2002/0163427 | A1 * | 11/2002 | Eryurek | G05B 23/027 340/500 |
| 2004/0103165 | A1 * | 5/2004 | Nixon | H04W 72/02 709/217 |
| 2004/0139085 | A1 * | 7/2004 | Eryurek | G05B 19/418 |
| 2005/0007249 | A1 * | 1/2005 | Eryurek | G05B 23/027 340/511 |
| 2005/0240289 | A1 * | 10/2005 | Hoyte | G05B 23/0294 700/49 |

(Continued)

*Primary Examiner* — Stephanie E Bloss
*Assistant Examiner* — Lisa Peters
(74) *Attorney, Agent, or Firm* — Pitts & Lake, P.C.

(57) ABSTRACT

A vibration data analysis and communication system to analyze vibration measurements from one or more machines including a sensor to detect vibration signals from a machine-under-test according to a predetermined test, a data acquisition unit to receive the vibration signals and to process the vibration signals to generate vibration data, an input unit to selectively receive field notes information from an operator of the data acquisition unit, a communication unit to transmit the vibration data and the field notes information to a remote analyst over a communication network, and to receive feedback from the remote analyst via the communication network regarding health of the machine-under test based on characteristics of the transmitted vibration data and field notes information, and a control unit to control operations of the sensor, the data acquisition unit, the input unit, and the communication unit.

40 Claims, 21 Drawing Sheets

(56) References Cited

U.S. PATENT DOCUMENTS

| | | | | |
|---|---|---|---|---|
| 2006/0184825 A1* | 8/2006 | Regan | .................... | G06Q 10/06 |
| | | | | 714/23 |
| 2007/0198215 A1* | 8/2007 | Bonanni | ............ | G05B 23/0251 |
| | | | | 702/183 |
| 2007/0200722 A1* | 8/2007 | Piety | .................. | G05B 19/4065 |
| | | | | 340/679 |
| 2007/0265790 A1* | 11/2007 | Sealing | ............... | G01M 5/0033 |
| | | | | 702/33 |
| 2009/0033736 A1* | 2/2009 | Thomason | ............. | H04N 7/147 |
| | | | | 348/14.02 |
| 2009/0112340 A1* | 4/2009 | Shen | .................. | G01M 13/028 |
| | | | | 700/97 |
| 2009/0193342 A1* | 7/2009 | Barthelmess | ......... | G06F 17/242 |
| | | | | 715/751 |
| 2011/0270525 A1* | 11/2011 | Hunter | ................... | E21B 41/00 |
| | | | | 702/6 |
| 2011/0282626 A1* | 11/2011 | Rikkola | ............. | G05B 23/0232 |
| | | | | 702/179 |

\* cited by examiner

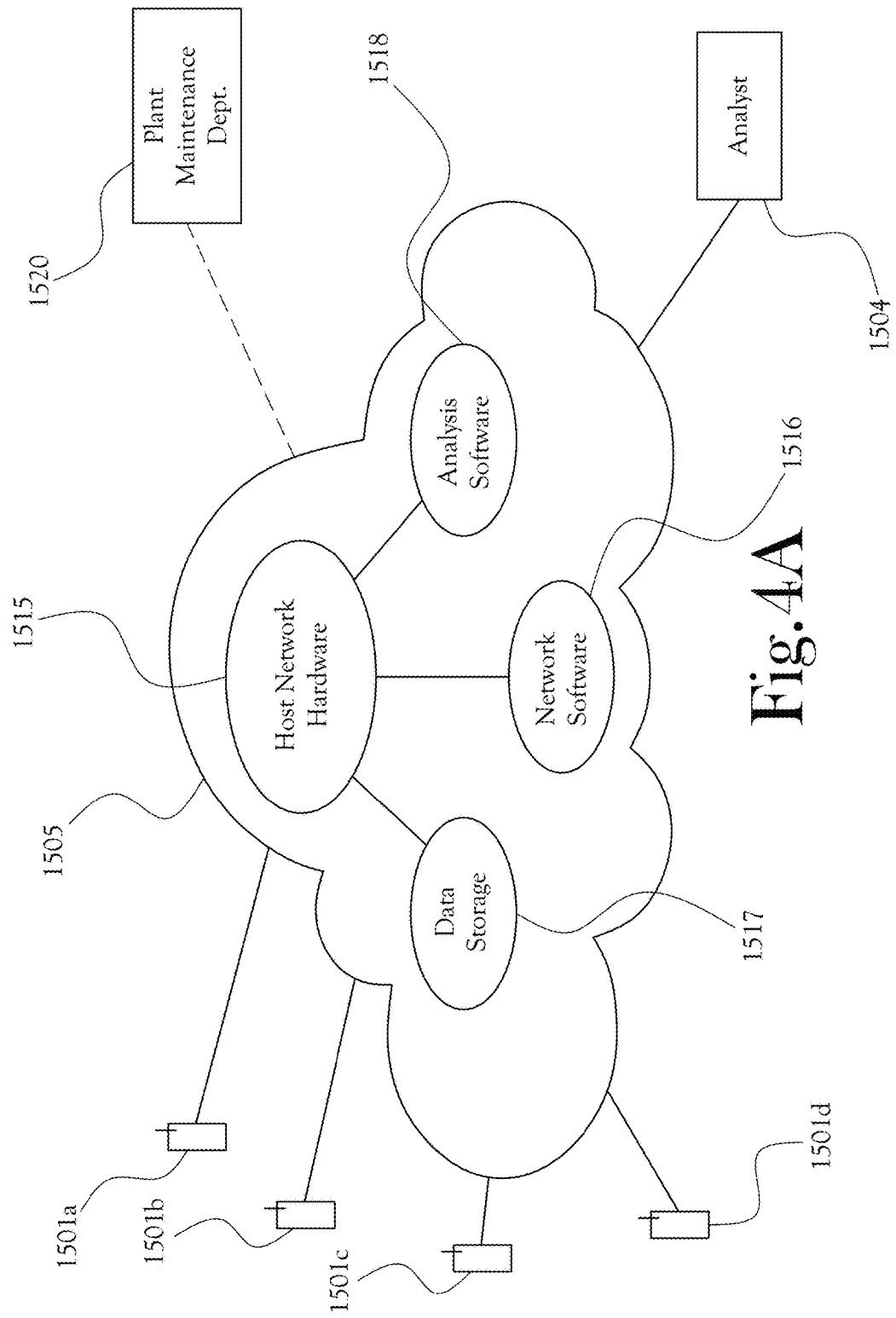

SYSTEMS AND METHODS FOR COMMUNICATING IN A PREDICTIVE MAINTENANCE PROGRAM USING REMOTE ANALYSTS

FIELD OF INVENTIVE CONCEPT

The present general inventive concept relates to predictive maintenance (PdM) programs for industrial applications, and more specifically, to communication systems and methods that ensure that information is available to all members of the team executing the PdM program even when the analysts are located remotely from the machines and personnel at the plant site.

BACKGROUND

Predictive Maintenance, or PdM, programs in industrial plants are frequently implemented by assigning a technician to use portable instrumentation, such as a vibration analyzer, an ultrasonic gun, and/or an IR camera, along a predetermined route to collect data related to the operation of the equipment on this route. This information, in turn, may then be used to diagnose problems or potential problems associated with the health and/or operation of the equipment, and to predict equipment availability.

For example, a PdM program may include a technician, i.e., operator carrying a vibration analyzer device to each machine located along a defined route. Upon reaching a particular machine that desired to be analyzed, a vibration sensor, such as an accelerometer, is physically coupled to the machine at one or more measurement locations. Specific measurements are acquired at each location on the machine as specified in the route instructions. The vibration sensor and analyzer then receive vibration data from the measurement locations, and may output this information on a display of the analyzer. Once the information on all machines on the route has been collected, this information is transferred to a host workstation which contains the entire database and the analysis software.

Most PdM programs are conducted by a team of a few individuals. The key functions to be performed are data collection and data analysis resulting in a status report identifying healthy machines and those in need of maintenance. In many cases, the same person may perform both functions, and in larger plants, program personnel will be assigned to different areas of the plant to provide coverage for all machines in the program. In other cases, one or more technicians may perform all of the data collection and other individuals may perform the analysis/reporting function. In either case, the individuals are typically in close proximity to each other, sometimes in the same office. If the analyst desires to inspect the machine or collect additional data to be more certain of his diagnosis, then he would typically travel to the location of the machine to perform more in depth troubleshooting. Many practitioners in the industry will not allow others to perform data collection for the machines that they must analyze because they believe that information picked up by the five senses when you are at the machine will not be effectively communicated back to them and that the technicians will not know when or how to collect more sophisticated measurements that could be needed to isolate the fault condition. Quality of remote analysis can be greatly improved when verifiable observations from the field are included with routinely collected data. Although this need for close communication between the analyst and the data collector is recognized, it has typically been handled by face-to-face verbal exchanges or text field notes attached to the route data.

The scheduling of both data collection and data analysis is also handled by word-of-mouth methods when the PdM personnel are located in close proximity to each other. It is common for vibration data to be collected periodically, for example once per month; however, equipment and personnel availability may cause the timing of the collection task to vary each month or even be omitted. Clearly, analysis cannot begin until data has been collected. As might be expected, the exchange of this information is typically handled verbally or via emails between team members.

Another important communication exchange should occur between the analyst and the maintenance planner. The analyst will commonly prepare a report which identifies machines in need of correction or maintenance. In many cases, the planner will have months of forewarning during which he can schedule work orders to be performed. The planner should schedule the maintenance actions in such a way as to minimize the impact of these repairs on the production of the plant. Thus, in many cases, an analyst may call a problem at a very early stage of degradation and track it for several months before a repair is performed. It is important to verify that the maintenance performed on the machine has corrected the problem. Further, it is important to know whether the faults that were identified were correct and if not, what was the fault condition discovered. It is also important to attempt to document the root cause of the fault which may be determined from an inspection of the damage parts removed from the machine or machine conditions noted during the removal process. It is common practice for this communication exchange to occur via verbal exchanges or emails; however, the occurrence and fidelity of this exchange is often compromised by departmental priorities, physical separation, and the significant time delay which may occur between the identification and the correction of the fault.

When PdM programs were executed by small teams in close proximity to each other, the ad hoc communication methods were adequate. However, a new model for PdM programs has been developed which offers significant opportunities to improve the effectiveness and to reduce the cost of executing these programs. The new model utilizes a geographically diverse staff that relies upon the internet to communicate data and information between team members. There are many factors important to executing and sustaining a PdM program in a plant; however, one of the hardest factors to manage and maintain is the need for diagnostic expertise. A skilled analyst typically takes a number of years to learn his trade and the pool of those with this skill is in diminishing supply. Bringing the data to the analysts, rather than bringing the analysts to the machines, can improve the effectiveness and reduce the overall cost of these programs.

SUMMARY

Example embodiments of the present general inventive concept describe systems, methods, and techniques designed to execute a PdM program using a virtual diagnostic center and employing a multi-vector closed loop communication system and data collection analyzers with enhanced communication capabilities. These systems and methods, along with the hardware and software components designed to realize them, can be used to implement a program to bring high fidelity information and data to people who need it rather than requiring people to reside at or travel to the site where the data is being generated (or where the subject equipment to be diagnosed is located). The closed-loop communications system provides acknowledgement at the point of use when the program is executed with teams which are separated geographically, and provides higher fidelity communications even when team members are physically close.

The use of a virtual diagnostic center also enables greater expertise to be available to the plant PdM program. The previous systems and methods generally relied upon a single analyst dedicated to the program. Analysis software and data which resided upon the host workstation was relatively unavailable to others who did not have physical access to the workstation. Access to the virtual diagnostic center is available to analysts anywhere in the world who have appropriate credentials. This greatly facilitates the review of a primary analyst's diagnosis by a second analyst. It also means that specific problems which are particularly complex or associated with a certain class of equipment can be assigned to an analyst with specific in-depth expertise. This capability for accessing wider review and collaboration will translate into machine health reports which are more accurate. Additionally, the availability of a team of analyst makes the program less vulnerable to the loss of a single key individual resulting in programs that are more sustainable over many years.

Additional features and embodiments of the present general inventive concept will be set forth in part in the description which follows and, in part, will be obvious from the description, or may be learned by practice of the present general inventive concept.

In some example embodiments of the present general inventive concept, the foregoing and/or other aspects and advantages of the present general inventive concept may be achieved by a vibration data analysis and communication system to analyze vibration measurements from one or more machines including a sensor to detect vibration signals from a machine-under-test according to a predetermined test; a data acquisition unit to receive the vibration signals and to process the vibration signals to generate vibration data; an input unit to selectively receive field notes information from an operator of the data acquisition unit; a communication unit to transmit the vibration data and the field notes information to a remote analyst over a communication network, and to receive feedback from the remote analyst via the communication network regarding health of the machine-under test based on characteristics of the transmitted vibration data and field notes information; and a control unit to control operations of the sensor, the data acquisition unit, the input unit, and the communication unit.

In some embodiments, the field notes information includes one or more of a pre-defined note, a typed or handwritten free-text note, a voice recording, a sound recording, a photograph, and a video recording.

In some embodiments, the field notes information includes information regarding specific components or locations proximate the machine-under-test.

In some embodiments, the control unit is configured to prompt the operator to input an acknowledgement to confirm receipt of a received instruction from the remote analyst before any measurement tests can be performed on the machine-under-test.

In some embodiments, the control unit is configured to instruct the communication unit to transmit the acknowledgment to the remote analyst.

Some embodiments further include a remote diagnostic unit connectable to the communication unit and the remote analyst, the remote diagnostic unit including a report generator to generate a diagnostic report based on the received vibration data, the remote diagnostic unit including an instruction unit to transmit an instruction to the remote analyst to review the field notes and to prompt the remote analyst to input an acknowledgement to confirm the field notes have been reviewed before the diagnostic report is generated, and to transmit the acknowledgment to the communication unit.

In some embodiments, the control unit includes an expert system to screen the vibration data to identify one of more faults in the vibration data, and to instruct the control module to provide one or more additional test recommendations to the operator based on the one or more faults.

In some embodiments, the sensor detects additional vibration signals from the machine-under-test according to the one or more additional tests, and the data acquisition unit receives and processes the additional vibration signals to generate additional vibration data according to the one or more additional tests, and the expert system is configured to screen the additional vibration data to determine whether the one or more identified faults exist in the additional vibration data.

Some embodiments further include a remote diagnostic unit in communication with the remote analyst to generate a diagnostic report based on received vibration data, the remote diagnostic unit including an instruction unit to transmit an instruction to the remote analyst to input an acknowledgement to confirm the additional vibration data has been reviewed before the diagnostic report is generated, and to transmit the acknowledgment to the communication unit.

In some embodiments, the expert system instructs the control unit to provide one or more recommended maintenance events to the operator based on the one or more faults that exist in the vibration data.

In some embodiments, the expert system instructs the control unit to record maintenance status information of the one or more recommended maintenance events, and to transmit an instruction to the remote analyst via the remote diagnostic unit to review the maintenance status information before the diagnostic report is generated.

In some embodiments, the remote diagnostic unit is configured to prompt the remote analyst to input another acknowledgment to confirm the maintenance status information has been reviewed, and to transmit the another acknowledgment to the communication unit.

In some embodiments, the diagnostic report includes the maintenance status information of the maintenance events for each machine-under-test, and the remote diagnostic unit includes an analysis module to modify the maintenance status information and/or maintenance events via a web portal of the communication network.

In some embodiments, the data acquisition unit expert system contains a list of special test measurements that can be selectively performed on the machine-under-test using predefined and/or customizable test parameters chosen by the operator.

In some embodiments, operator and/or remote analyst can add special tests to the list of special test measurements.

In some embodiments, the field notes information includes priority flags to alert the remote analyst to review the received vibration data on a priority basis.

Some embodiments further include a remote control unit connectable to the communication unit over the communication network to enable the remote analyst to remotely control operations of the vibration data analysis and communication system.

Some embodiments further include a data center to receive the field notes information and the vibration data and a processor to detect the presence of new vibration data at the data center, and to inform the remote analyst of its availability.

Some embodiments further include a data center to receive the field notes information and the vibration data and a processor to screen the field notes information, and to inform the remote analyst of vibration data tagged as being in need of immediate attention by the operator.

In some embodiments, the field notes information consists of a real-m time text, voice, and/or video conversation between the analyst and field technician coupled with mutually accessible test data.

In some embodiments, the control unit includes an expert system to screen the vibration data to identify one of more faults in the vibration data, and automated screening may be controlled by the field notes information.

The foregoing and/or other aspects and advantages of the present general inventive concept may be achieved by a method of collecting and analyzing vibration data, including detecting vibration signals from a machine-under test according to a predetermined test; processing the vibration signals to generate vibration data; inputting field notes information from a field technician corresponding to the vibration data; transmitting both the vibration data and the field notes information to a remote analyst via a communication network; remotely accessing and analyzing the vibration data and the field notes information to identify health characteristics of the machine-under test; and providing feedback to the operator from the remote analyst regarding the health characteristics of the machine-under-test.

In some embodiments, the feedback includes instructions to perform additional tests on the machine-under-test.

In some embodiments, the feedback includes instructions to perform certain maintenance activities on the machine-under-test.

Some embodiments further include generating a diagnostic report based on the health characteristics of the machine-under-test.

Some embodiments further include prompting the remote analyst to input an acknowledgment to confirm the field notes information has been reviewed before the diagnostic report can be generated.

The foregoing and/or other aspects and advantages of the present general inventive concept may be achieved by a vibration analyzer unit to collect data on a predefined set of machines at predefined test locations including: a sensor to detect vibration signals from a machine-under-test according to one or more predetermined tests; a data acquisition unit to receive the vibration signals and to process the vibration signals to generate vibration data; an input unit to receive field notes information from an operator of the data acquisition unit based on physical observations of the machine-under-test; and a communication unit to transmit the vibration data and the field notes information to a remote analyst over a communication network, and to receive feedback from the remote analyst via the communication network regarding health of the machine-under test based on characteristics of the transmitted vibration data and field notes information.

The foregoing and/or other aspects and advantages of the present general inventive concept may be achieved by A remote diagnostic center to receive vibration data and field notes information over a communication network from one or more portable or installed vibration analysis units located at one or many machine sites, including a data center to receive, store, and provide secure backup for the received vibration data and field notes information, the data center including a communication module, a database management module, a diagnostic analysis module, and a portal module to enable one or more remote analysts to review and collaborate on the received vibration data and field notes information, and to monitor and report to a diagnostic center manager whether the vibration data and field notes information corresponding to a particular machine-under-test is being processed by an analyst and will be completed within a specified time interval specific to the machine-under-test, wherein the communication module includes a monitoring unit to monitor the receipt of prioritized data from the one or more vibration analysis units, and notifies the diagnostic center manager and one or more of the remote analysts of the need for priority review and report on a reduced time schedule of the prioritized data.

In some embodiments, the communication module includes an alert unit to alert the one or more remote analysts that data from a machine-under-test is ready to be analyzed.

In some embodiments, the communication module includes an alert unit to alert an operator of the vibration analysis unit that data from a particular machine-under-test or a specified set of machines is due or overdue for collection, and notifies the diagnostic center manager and a manager of the operator when periodic routine data collection is overdue.

In some embodiments, the communication module is configured to send notifications via pagers, email, text messages, automated voice phone calls, visual representations, or combinations thereof.

In some embodiments, the analysis module is configured to generate a diagnostic report based on the received vibration data, and the analysis module is configured to alert the one or more remote analysts to the presence of field notes information at the remote diagnostic center, and to prompt the one or more remote analysts to acknowledge the presence of the field notes information before the diagnostic report is completed.

In some embodiments, the analysis module is configured to enable the one or more remote analysts to generate requested action notes to be executed by the operator of the vibration analysis unit.

Some embodiments further include an operational dashboard module, accessible over the communication network, to report which of the one or more remote analysts are actively analyzing the vibration data, to identify the number of machines assigned to each analyst for review, and to identify overload states which will likely result in reports not being available based on the commitment schedules.

In some embodiments, The remote diagnostic center of claim 34, wherein the operational dashboard module reports which particular machine is ready for analysis and/or which particular analysts are not active.

Some embodiments further include an operational dashboard module, accessible over the communication network, to identify the state of scheduled data collection for plants being monitored at the data center, and to identify machines or routes of machines that are due or overdue for routine data collection.

Some embodiments further include an operational dashboard module, accessible over the communication network, to identify a remaining time in a response commitment of prioritized data, and to indicate if the prioritized data is currently being analyzed.

Some embodiments further include an operational dashboard module, accessible over the communication network, to estimate a current total analysis workload for all data received for analysis and currently available capacity of available analysts, and to identify a capacity surplus or shortfall.

In some embodiments, the operational dashboard module presents a workload of each analyst, including total machines to be analyzed and a number of machines to analyze per hour.

In some embodiments, the communication module generates alert messages to an assigned remote analyst and the diagnostic center manager at a set of checkpoints, including specified percentages of response time that has elapsed for routine and prioritized data.

In some embodiments, the communication module generates alert messages to a maintenance planner indicating that machines in a particular plant have been reviewed, and generates reports identifying health status and recommended maintenance actions of the machines-under-test.

In some embodiments, the analysis module the analysis module is configured to generate a diagnostic report based on the received vibration data and to generate events to be tracked for recommended maintenance actions based on review of received vibration data, and to prompt the one or more remote analysts to acknowledge any open maintenance events before the diagnostic report is generated.

In some embodiments, the portal module is configured to provide a maintenance planner, via the communication network, to review or download requested maintenance events, to create new maintenance events to be tracked, and to provide follow-up information related to each maintenance event until the maintenance event is closed.

In some embodiments, the portal module is configured to provide the operator, via the communication network, to review or download scheduled data collection routes and to upload data stored in the vibration analysis unit to the data center for review by the one or more remote analysts.

In some embodiments, the communication module is configured to enable a database of the vibration analysis unit to replicate with a master database in the data center, via the communication network, for data redundancy.

BRIEF DESCRIPTION OF THE DRAWINGS

The following example embodiments are representative of example techniques and structures designed to carry out the features of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 4A is a block diagram illustrating one example embodiment of a closed loop system according to the present general inventive concept;

FIG. 21 illustrates a screen shot of a maintenance event tracker screen according to an example embodiment of the present general inventive concept, wherein each recommended action by the analyst automatically creates an event that will be tracked until the recommended maintenance has been performed and has corrected the problem;

FIG. 22 illustrates a screen shot of a maintenance event tracker screen according to an example embodiment of the present general inventive concept, wherein the analyst may elect to group multiple recommended actions into one tracked event if it is logical for the recommendations to all be performed concurrently;

FIG. 23 illustrates a screen shot of a maintenance event tracker screen according to an example embodiment of the present general inventive concept, wherein the maintenance planner can also group individual recommended actions into one event by assigning the same work order number to the separate events;

FIGS. 25A and 25B illustrate screen shots of maintenance event tracker screens according to an example embodiment of the present general inventive concept, including event screens available via a Web Portal that allows the plant maintenance personnel to provide feedback on each event and close it out when the condition is corrected.

DETAILED DESCRIPTION

Reference will now be made to example embodiments of the present general inventive concept, examples of which are illustrated in the accompanying drawings and illustrations. The example embodiments are described herein in order to explain the present general inventive concept by referring to the figures.

It is noted that the following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

Figure 1:
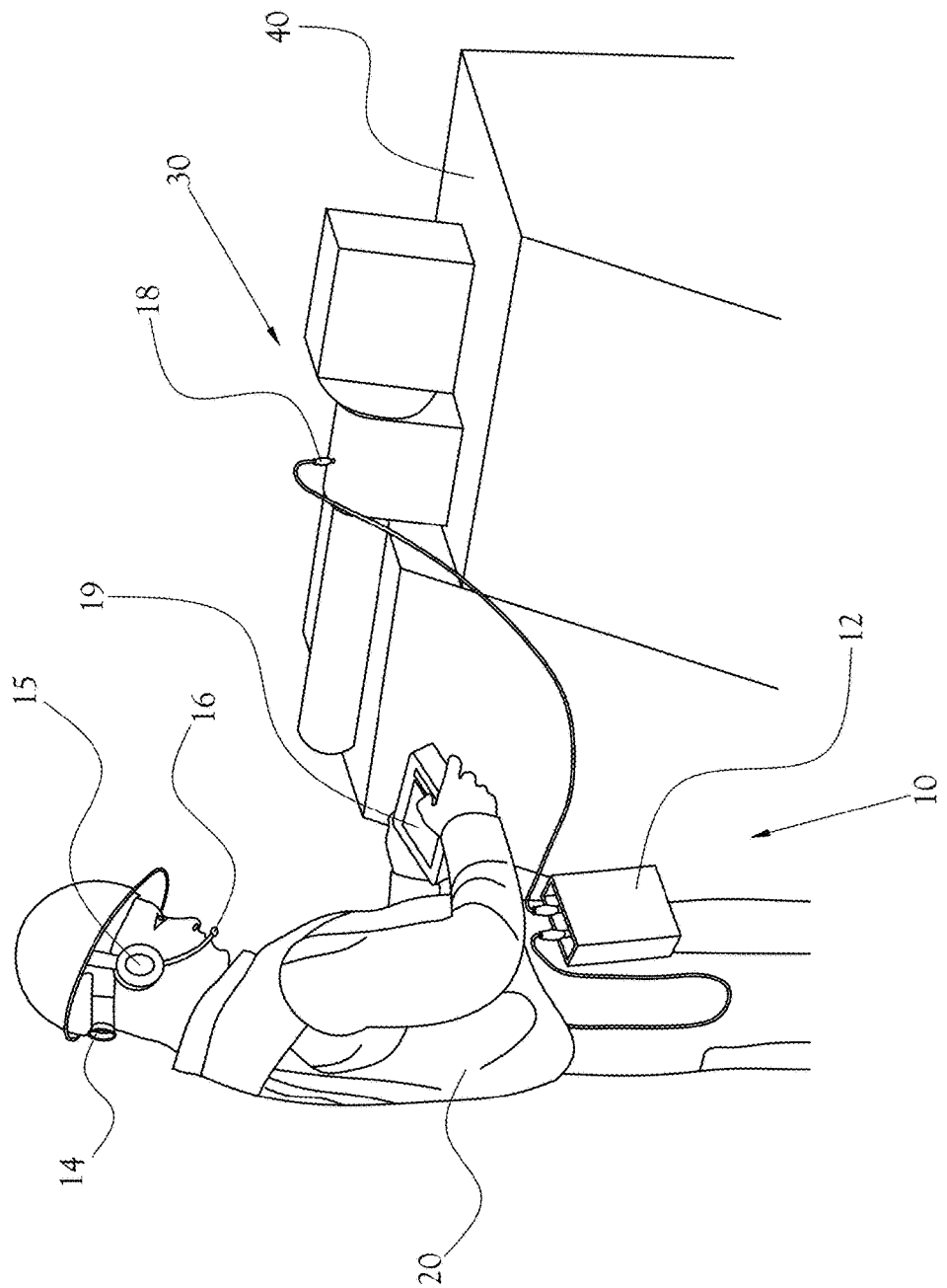
FIG. 1 illustrates a field inspection device being used by an operator according to an example embodiment of the present general inventive concept.

FIG. 1 illustrates an example embodiment of a device 10 being used by a technician or operator (hereinafter "field technician") 20 to collect vibration data at a specific location 30 on a machine 40. According to the example embodiment of FIG. 1, the device 10 includes a main housing 12, generally worn by the field technician on a belt or in another manner that does not require the field technician 20 to employ a hand in holding the main housing 12; a headset 14 with earpiece 15 and microphone 16; a sensor 18; and a control unit 19 for displaying information and for receiving manual commands from the operator 20.

The device 10 allows the field technician to record field notes, also referred to as complex notes, including notations, comments, pictures, videos, or other characterization remarks, related to the vibration data collected at each location of the machines along the route. For example, as the field technician 20 proceeds along a data collection route, it is possible for the field technician to collect a number of discrete vibration data measurements corresponding to various locations on a machine, and to create complex field notes, including photographs, videos, or other manually or verbally entered data to increase relevance of the collected data. Such field notes include, but are not limited to, verbally entered notes, hand-written or typed notes, selections from a predefined list of observations, still and/or motion pictures, audio data, etc. These field notes can be combined with the collected vibration data measurements for a certain machine (s)-under-test to form an assembled data packet, or separate data packets, to be communicated to the centralized host data structure (for example using internet or cloud computing communication techniques). It is possible for the analyst and field technician to communicate information back and forth via a commonly accessible host structure to enhance data collection quality and efficiency.

The analyst can access the field notes and vibration data from the host structure to interpret the vibration data considering the added context of field notes when evaluating the condition of the machine. The analyst may be in another part of the industrial site, or may be situated remotely at a very distant physical location, perhaps many miles distant. The vibration analyzer can include an onboard expert system that can screen the routine measurements collected for each machine and recommend additional measurements which may help confirm diagnosed faults.

In some embodiments, the vibration analyzers can support remote control operation. The vibration analyzer can immediately transmit field data or machine status to a data center using wireless or cellular technology, and can transmit a request that an analyst review the transmitted data and provide consultation in text or verbally.

The vibration analyzer can collect data on a predefined set of machines at predefined test locations acquiring predefined test measurements and other observable information from physically inspecting the machine, and can transfer the collected data and information to a remote diagnostic system for evaluation by a remote analyst. The system can include a sensor to detect vibration signals from a machine-under-test, a data acquisition unit to receive the vibration signals and to process the vibration signals to generate vibration data, an input unit to receive complex note information from an operator of the data acquisition unit, a communication unit to transmit the vibration data and the complex note information to a remote analyst, and to receive instructions from the remote analyst based on the transmitted vibration data and the complex note information. The communication unit can enable a remote analyst to connect to the analyzer over the internet using wireless or cellular methods and operate the instrument to control the data acquisition process and review collected data.

Some embodiments of the present general inventive concept comprise analysis software that presents the machines for processing in the order of severity as defined by the results of screening by the automated expert system. The analysis software can present flagged or priority complex notes on the diagnostic console and can prompt an analyst to review and acknowledge the flagged or priority complex notes before the diagnosis and report can be completed.

The analysis software can present special test measurement notes on the diagnostic console and can prompt an analyst to acknowledge the presence of these special test measurements before the diagnosis and report can be completed. The analysis software can also present follow-up reports on maintenance performed on the machine since the last review on the diagnostic console and can prompt an analyst to acknowledge the presence of this information before the diagnosis and report can be completed. In some embodiments, the analysis software presents notification of any previously recommended actions which are still open on the diagnostic console and prompts an analyst to acknowledge their current status before the diagnosis and report can be completed. The analysis software can create events for each recommended maintenance action on each machine that are tracked until closed by the maintenance planner or by the analyst. In some embodiments, the analysis software allows requested actions to be generated at the diagnostic console and be transmitted to the vibration analyzer. The vibration analyzer can be operated by a field technician at the machine or the vibration analyzer can be controlled remotely by an analyst via the internet to view the machine in real time, to communicate to the field technician where to position the sensor(s), and to setup and perform special tests.

In some embodiments, communications software detects the presence of new data at the data center and informs the diagnostic center director and primary analyst of its availability. The communications software can screen the field notes delivered with the measured data to the data center and can inform the diagnostic center director and primary analyst of any machines tagged as needing immediate attention by the field technician.

Web portal software can be provided to present the latest health status of all machines in the program, to identify diagnosed faults and recommended corrective maintenance actions to be viewed and downloaded by a maintenance planner. In some embodiments, the web portal software can allow the maintenance planner to update the follow-up maintenance actions scheduled or completed in response to the corrective maintenance recommended as these events occur.

Figure 2A:
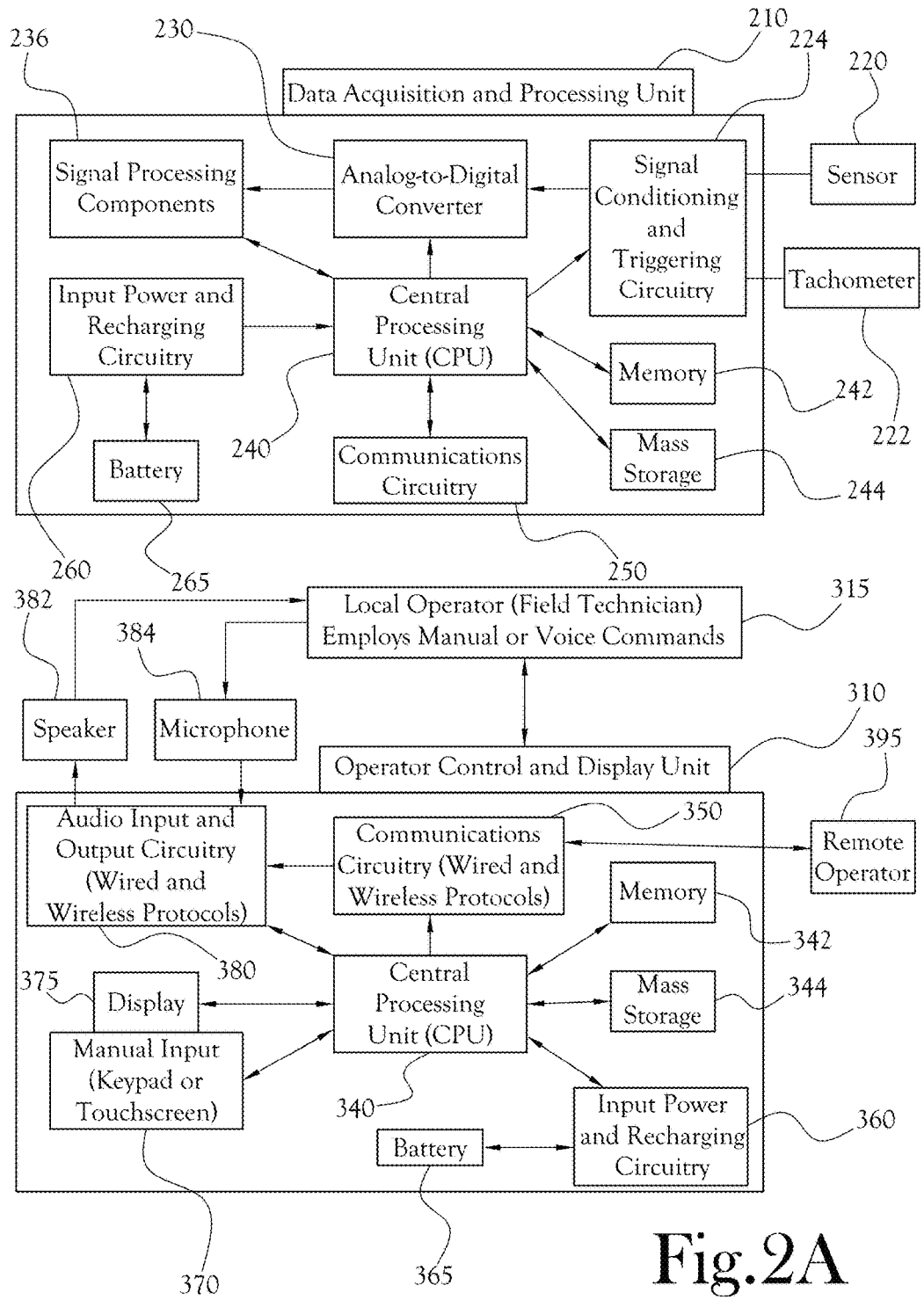
FIG. 2A is a block diagram illustrating one example embodiment of the hardware design of a field inspection device according to an example embodiment of the present general inventive concept.

FIG. 2A is a block diagram illustrating an example hardware design of a field inspection device according to an example embodiment of the present general inventive concept. As illustrated in FIG. 2A, the example field inspection device includes a data acquisition and processing unit 210 and an operator control and display unit 310. Here, the data acquisition and processing unit 210 includes at least one sensor 220, at least one tachometer 222, signal conditioning and triggering circuitry 224, an analog-to-digital converter 230, signal processing components 236, a central processing unit or CPU 240, memory 242, mass storage 244, communications circuitry 250 with wired and wireless protocols, and Input Power and Recharging Circuitry 260 along with a battery 265. The operator control and display unit 310 includes Input Power and Recharging Circuitry 360 along with a battery 365, a central processing unit or CPU 340, memory 342, and mass storage 344. In the illustrated example embodiment, the operator control and display unit 310 also comprises communications circuitry 350 with wired and wireless protocols, which allows access to the operator control and display unit 310 by a remote operator 395 using wireless or cellular access to the Internet, a manual input device 370, such as a keypad or touchscreen, and a display 375. These components enable the on-site field technician 315 to interact with the operator control and display unit 310. In the illustrated example embodiment, the operator control and display unit 310 can include audio input and output circuitry 380 using available wired and wireless protocols. The audio input and output circuitry can be connected with a speaker 382 and a microphone 384 to enable the on-site field technician 315 to interact with the operator control and display unit 310.

The portable vibration analyzer can collect data on a predefined set of machines at predefined test locations acquiring predefined test measurements and other observable information from physically inspecting the machine. The analyzer can include a sensor to detect vibration signals from a machine-under-test and a data acquisition unit to receive the vibration signals and to process the vibration signals to generate vibration data. The analyzer can perform routine tests and special tests. The routine tests can be predefined tests that are conducted each time to monitor certain routine operating conditions. Special tests can be conducted based on diagnoses, observations (e.g., complex notes), and/or recommendations. These special tests are typically not carried out each time, but instead are performed specially to check certain operational conditions not routinely checked. The analyzer can carry out operations to automatically create complex field notes which document special test measurements which have been collected. Onboard software can contain expert analysis capabilities to review the predefined measurements at the machine and to recommend special test measurements to be performed to provide improved differentiation or confirmation of suspected fault conditions. The onboard software can contain a list of special test measurements that can be selected and executed using predefined test parameters or allows these parameters to be modified by the field technician. The field technician or the remote analyst can add special tests to the list of special test measurements that can be selected and executed using predefined test parameters.

Figure 2B:
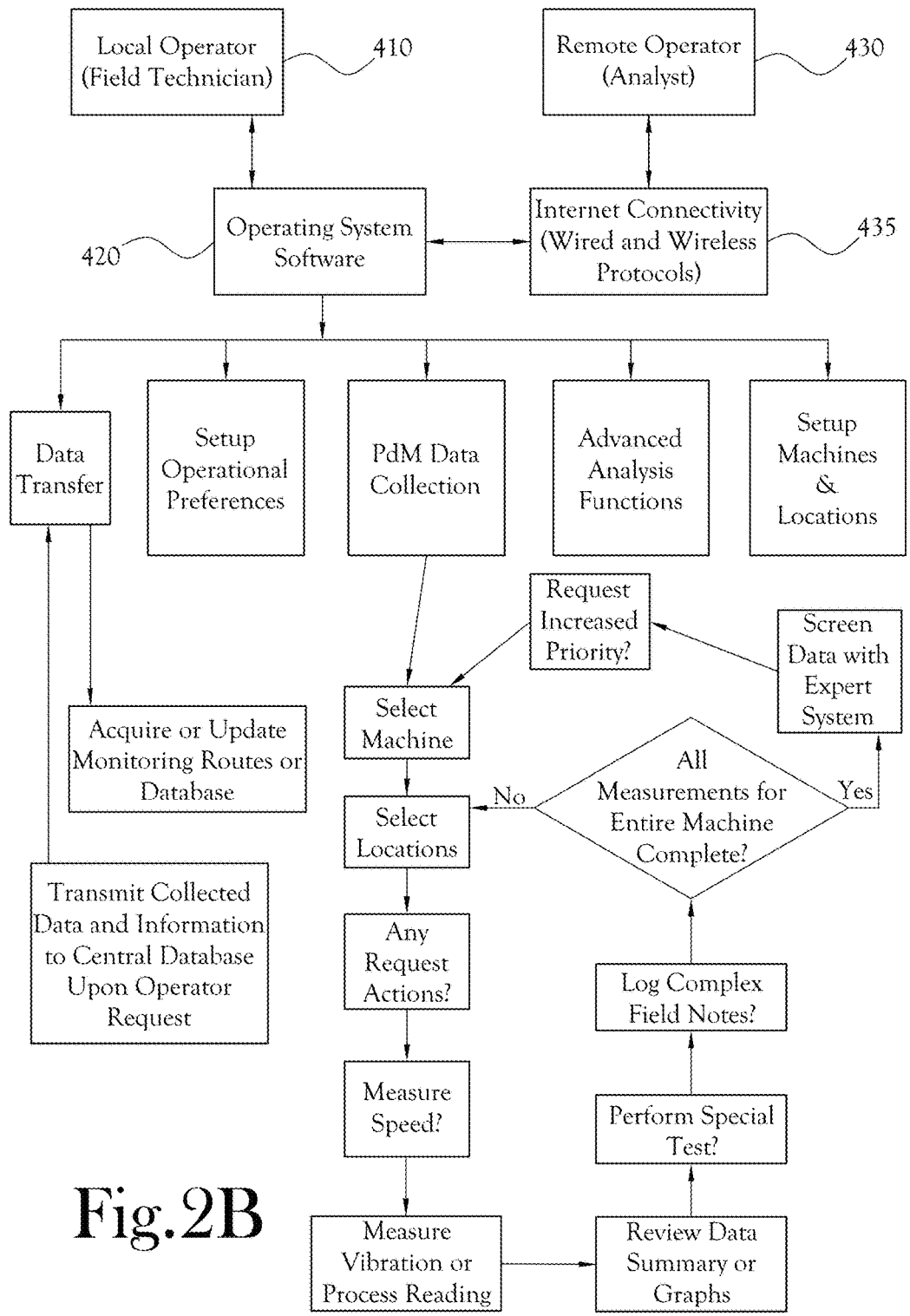
FIG. 2B is a block diagram illustrating one example embodiment of vibration data collection and analysis software according to an example embodiment of the present general inventive concept.

FIG. 2B is a block diagram illustrating example operations to be performed in accordance with an example embodiment of the present general inventive concept. The block diagram illustrates an operational relationship between a local operator or field technician 410, the operating system software 420, and a remote operator or analyst 430 interacting with the operating system software through internet connectivity 435. Generally, the internet connectivity will comprise known or later developed wired and/or wireless protocols chosen with sound engineering judgment. FIG. 2B further illustrates a number of functions and processes carried out by or with operating system software.

Figure 3A:
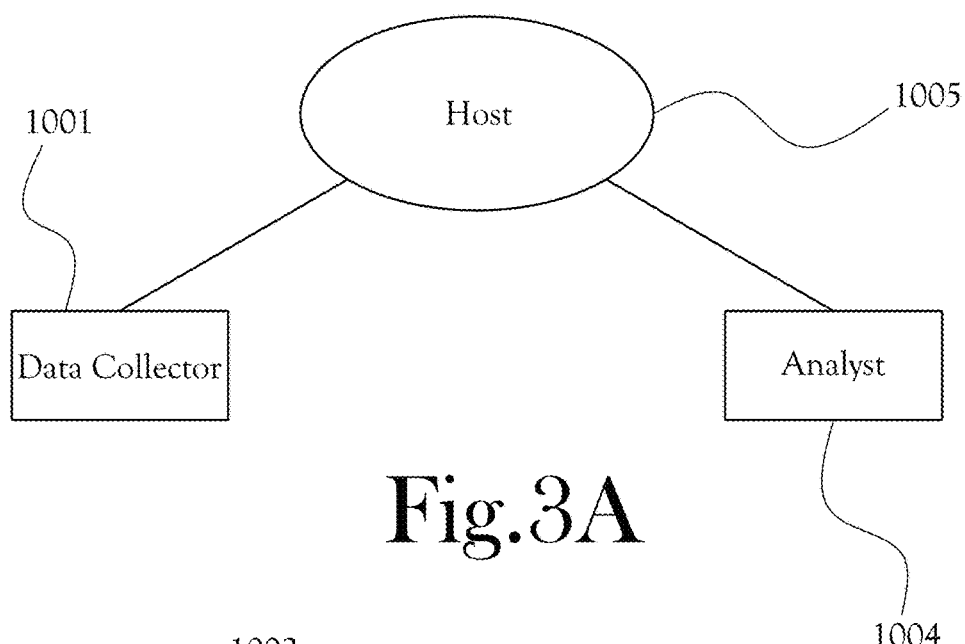
FIG. 3A is a block diagram illustrating one example embodiment of a closed loop system according to the present general inventive concept.

FIG. 3A is a block diagram illustrating an example embodiment of a closed loop system according to the present general inventive concept. In this illustrated example embodiment, the closed loop system comprises a data collector 1001 with a device; an analyst 1004 with access to data processing or data analysis equipment, and a host structure 1005 to enable communication of messages and data between the field technician and the analyst.

Figure 3B:
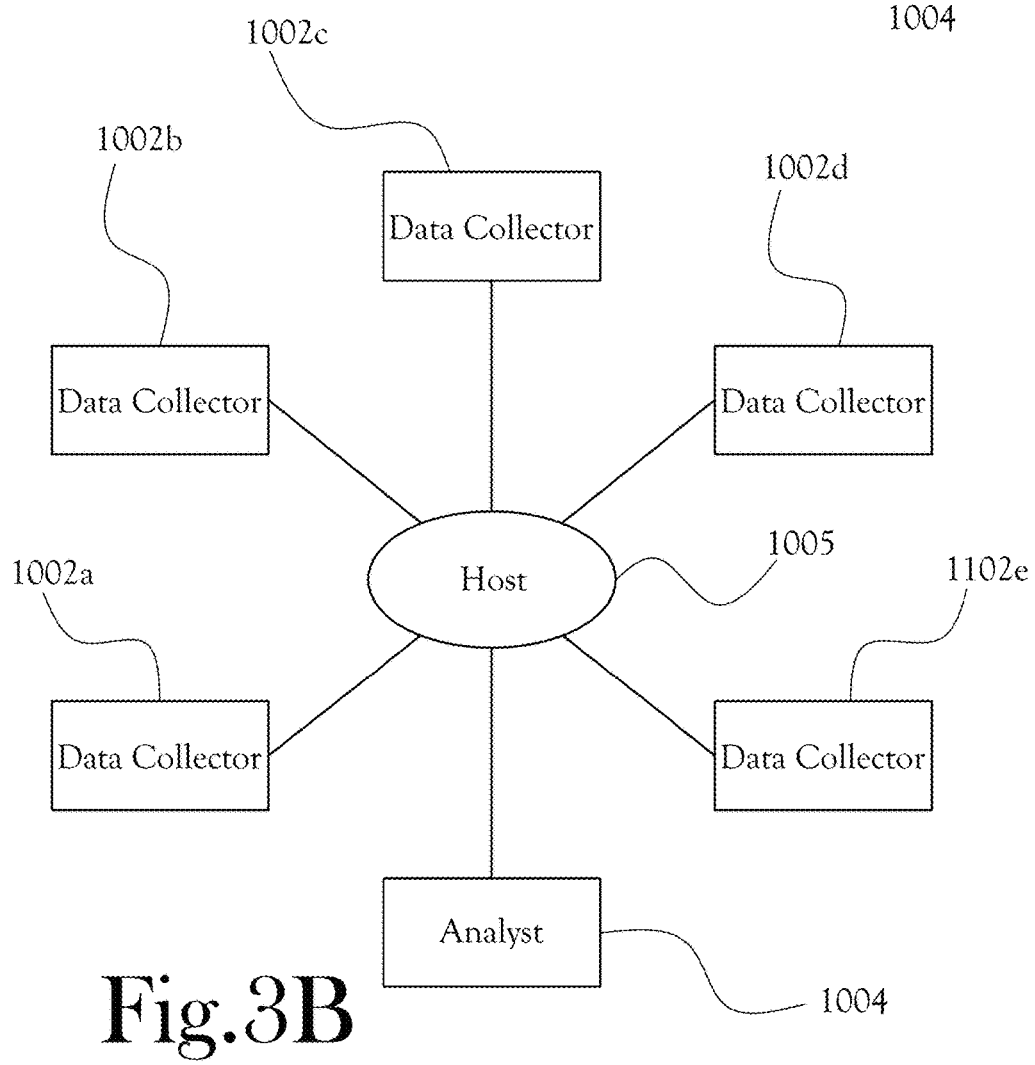
FIG. 3B is a block diagram illustrating one example embodiment of a closed loop system according to the present general inventive concept.

FIG. 3B is a block diagram illustrating a similar example embodiment of a closed loop system. In the illustrated example embodiment in FIG. 4B, the closed loop system comprises an analyst 1004 in communication with a host structure 1005 that allows the analyst to communicate with several field technicians 1002a-e. In the example embodiments of FIGS. 3A and 3B, the field technicians are equipped with data acquisition apparatus including components for collecting vibration data, receiving voice notes and verbal instructions from the field technician, receiving typed notes and manually entered instructions from the field technician, enabling the field technician to record photo and/or video data of the machine environment. Such field note information can be sent to an analyst, together with the vibration data, via the host structure 1005.

As the field technician proceeds along a data collection route, it is possible for the field technician to collect a number of discrete vibration data measurements corresponding to various locations on a machine, and to create complex field notes, including photographs, videos, or other manually or verbally entered data to increase relevance of the collected data. These field notes can be combined with the collected vibration data measurements for a certain machine(s)-under-test to form an assembled data packet, or supplemental data packets, to be communicated to the analyst, for example using internet or cloud computing communication techniques. It is possible for the analyst and field technician to communicate information back and forth via a host structure to enhance data collection quality and efficiency.

The analyst can access the field notes and vibration data from the host structure to interpret the vibration data considering the added context of field notes while evaluating the condition of the machine. The analyst may be in another part of the industrial site, or may be situated at a very distant location, perhaps many miles distant.

FIG. 4A is a block diagram illustrating a closed loop system according to an example embodiment of the present general inventive concept. In FIG. 4A, a number of field technicians 1501a-d can be in communication with a remote diagnostic unit generally illustrated as a cloud 1505. The cloud 1505 can incorporate host network hardware 1515 running program software 1516 to manage the network and to control communication between different components of the closed loop system. One example embodiment of the "cloud" would be one or more data centers which utilize the internet to exchange information with users anywhere in the world. The term "cloud" as used herein is intended to include any known or later developed communication network system, and is not intended to limit the scope of the present general inventive concept.

Referring to FIG. 4A, the cloud 1505 can include data storage hardware 1517 to store and distribute data between components of the closed loop system, and analysis software 1518 can be implemented to analyze the field note data and vibration data received from the various field technicians 1501a-d. One or more analysts 1504 can be in communication with the cloud 1505, and the closed loop system allows the analyst(s) 1504 to access the data received from the field technicians and to run analysis software 1518 from the cloud 1505 as needed.

In some embodiments, the analyst 1504 can access the cloud 1505 using a conventional computing instrument, permitting an analyst to perform analysis even when the computing instrument before the analyst does not have the analysis software installed on local drives. The analyst can utilize a computing device including some portion, none, or all of the analysis software in conjunction with the cloud 1505.

Analysts and data collectors can communicate in real time. The analyst may communicate instructions, task requests, and results to one or more field technicians in the field. The closed loop system allows the field technicians to send messages to an analyst, such as a request for expedited or emergency analysis. The host network hardware 1515 and network software 1516 within the cloud 1505 allow these and other communications between the field technicians and analysts to travel through the cloud. In some embodiments, the closed loop system also allows the field technicians and analysts to communicate with third parties or systems, such as a plant maintenance department 1520.

The host structure that enables and facilitates communication between the field technician and the remote analyst can take a variety of forms, and is not limited to any particular network configuration. In some embodiments, the host structure can include dedicated servers adapted for communication between the field technician and analyst and possessing capabilities for data storage and data analysis. In some embodiments, the host structure includes a local network of computing devices, and the host structure can include a combination of software and hardware that are configured as a "cloud" and accessible via the internet or other network connections. Some or all of the analysis software used by the analyst for analysis of information can be stored on the host structure (e.g., in the cloud), and the analyst can access the analysis software remotely.

In some embodiments, the system can recognize particular complex notes being exchanged in order to prompt a user to provide an acknowledgment before the field technician or analyst proceeds with a procedure or performs other tasks. Some complex notes can be prioritized (or "flagged") so that an analyst or field technician is prompted to give priority or urgent attention to certain circumstances based on data analysis. Also, in some embodiments, flagged complex notes can trigger the complex communication system software to direct the flagged complex note to additional users (such as a diagnostic center administrator or a plant safety supervisor) over the network.

The complex notes generated by a field technician can include additional measurements gathered by the field technician for a particular machine. For example, additional measurements within the complex notes can trigger the communication system software to automatically generate notations or flagged complex notes for the analyst, who then uses the notations or flagged complex notes in the process of diagnosing the condition of the machine and formulating recommendations. These notations or flagged complex notes can be automatically generated to provide an advantage in diagnosing machine conditions and formulating recommendations, since otherwise additional measurements gathered by the field technician might not be timely or automatically processed by the automated diagnostic software put in place to analyze the regular vibration data collected in normal course.

Figure 4B:
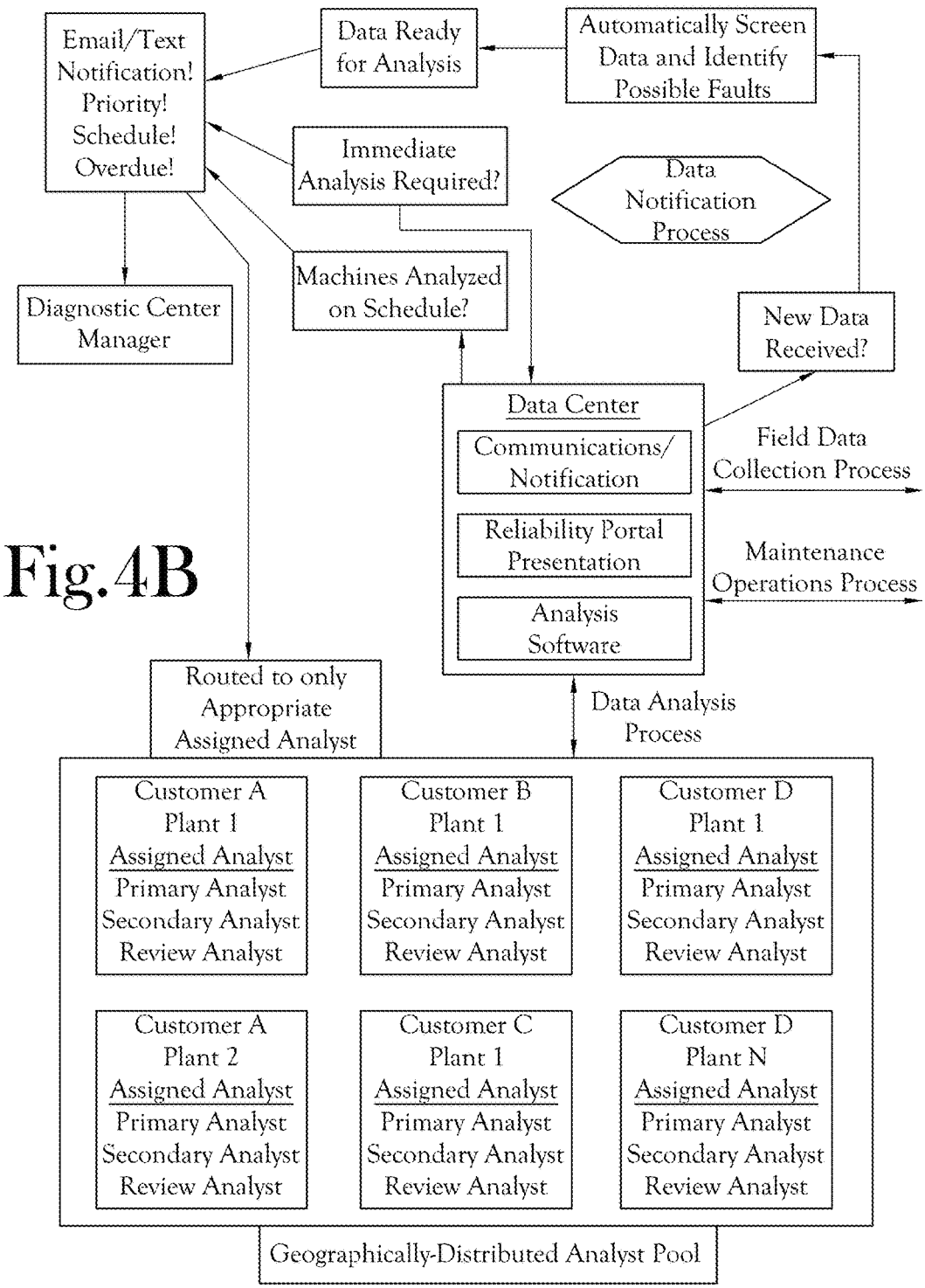
FIG. 4B is a flow diagram illustrating a diagnostic center operations process according to an example embodiment of the present general inventive concept.

Referring to FIG. 4B, the closed-loop system can be referred to as a virtual diagnostic center, wherein diagnostic center manager, analysts, field technicians, maintenance planners, reliability program manager, and/or other interested parties such as plant or corporate managers, have visibility and access to program functions so that all participants are marching in cadence.

There are various primary functions which depend upon high fidelity communication with the diagnostic center operation. These include the data collection process, the data analysis process, the maintenance process, and the program and plant management oversight. The virtual diagnostic center can be built upon a data center where various software applications are executing independently but exchanging information to ensure that it is acknowledged at the point of use. These applications support communications and notifications, a reliability program presentation portal, and analysis and reporting software all exchanging information from a shared database.

The communications and notification application is the logistics manager of the PdM program and receives all incoming data and transfers the data to the database. The application monitors when functions are scheduled or triggered and sends notices to the appropriate team members. It also serves to confirm that commitments are being met as agreed or sends warning and overdue notices if tasks are not completed on time. These monitored events include data collection schedules, data arrival and urgent analysis requests, analysis and report completion, and the availability of new machine heath status updates. The reliability presentation portal presents a prioritized list of the health status of all machines being monitored in the PdM program and the metrics describing how effectively the program is being executed. Also any reports that were generated from a route collection can be accessed and status of all recommended actions can be tracked.

The web portal can viewed from anywhere by means of an internet browser and is intended for use by plant and corporate staff as their primary avenue for receiving and exchanging information related to the PdM program. The diagnostic analysis software is generally the main tool used by the analysts to evaluate all incoming or historical data. This software contains expert system components that can automatically screen the new data received and provides an analysis console that forces the analyst to acknowledge all information related to the current state of the machine as well as review the routine data collected. This console provides a tool to facilitate creating a report and having that report reviewed by a second analyst.

Figure 4C:
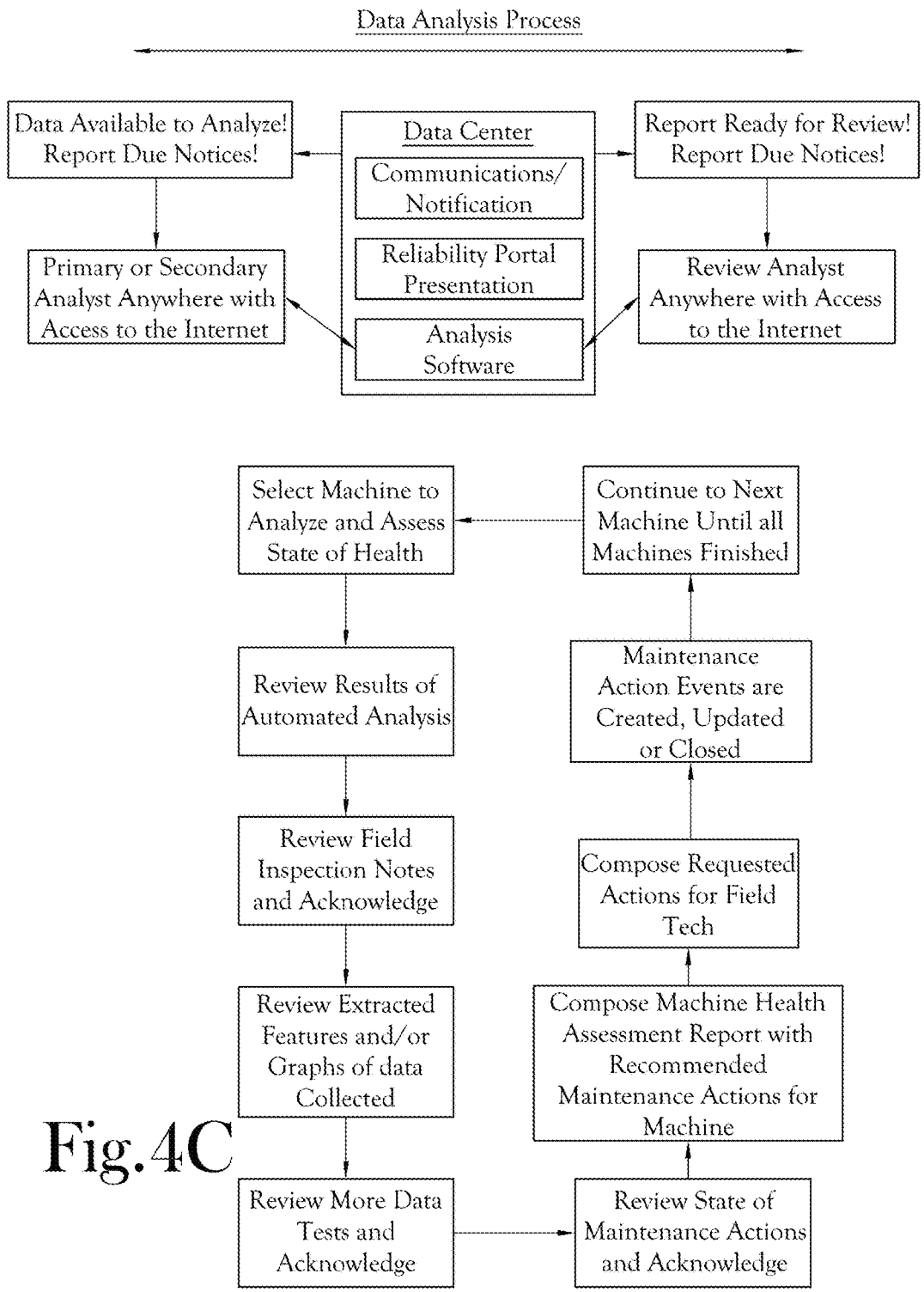
FIG. 4C is a flow diagram illustrating a data analysis process according to an example embodiment of the present general inventive concept.
Figure 4D:
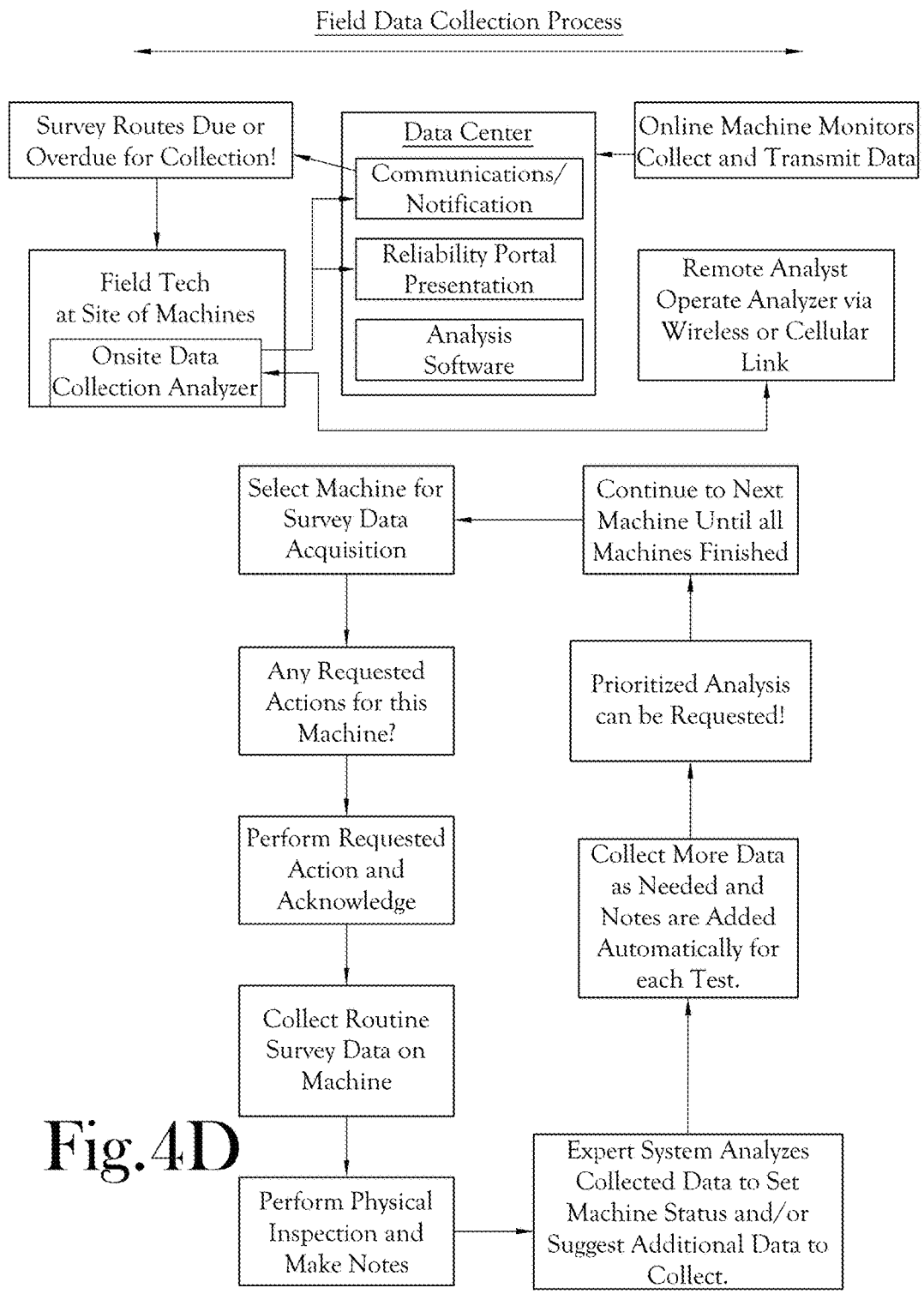
FIG. 4D is a flow diagram illustrating a field data collection process according to an example embodiment of the present general inventive concept.

Referring to FIG. 4D, the data collection process can be executed by a field technician who operates a PdM data analyzer that has enhanced communication features. The analyzer makes route measurements and enables complex field notes to be created even including photographs and sound or video recordings. The analyzer also carries analyst requests sent to the field technician which require acknowledgement before any data can be collected on the machine. The analyzer supports wired, wireless, or cellular connections to the internet, which allows data to be communicated from almost any location including the machine site. (One embodiment includes support for live text, voice, and/or video chat between the analyst and field technician. This communication allows direct connections to be setup between the analyst and the field technician where they can jointly perform a measurement and immediately review the results. Significant actions taken by the technician in the field, such as collecting additional tests, are logged by the analyzer and this extra data or information can be required to be acknowledged by the analyst when the analyst reviews the collected data during the diagnostic process. Field alerts generated from the technician can create an urgent notification to the analyst and can cause any machines in this category to be reviewed with highest priority.

Referring to FIG. 4C, the analysis process can present a commitment to act on any incoming data within a specified period after arrival at the diagnostic center. The effort can be overseen by the manager of the diagnostic center. For example, each machine in each plant can be assigned to a primary, a secondary, and a review analyst, and the machine test data can be reviewed by the primary analyst unless he is unable to do so, and/or delegated to the secondary or other analyst. When a notice is received that data has arrived and when the report is due, the primary analyst can be instructed to respond back to the diagnostic center manager within a period of time, for example 24-hours (or any other predetermined time period) as to whether he is able to meet the required task on time. If he does not, the diagnostic manager may receive notice that there has been no response and timely completion of the task is in jeopardy. Under this circumstance, the task may fall to the secondary analyst. When the analysis and report for the machines is complete, a notice can be sent to the review analyst to begin the review which is required to produce a final report. In some embodiments, the analysts can use the analysis software which resides in the diagnostic center to perform their review of the data, although the analysis software can reside in one or more other locations, locally or remote to the analyst, without departing from the scope of the present general inventive concept. As soon as the evaluation of a machine is complete and reviewed, the machine analysis is available immediately through the web portal.

Figure 4E:
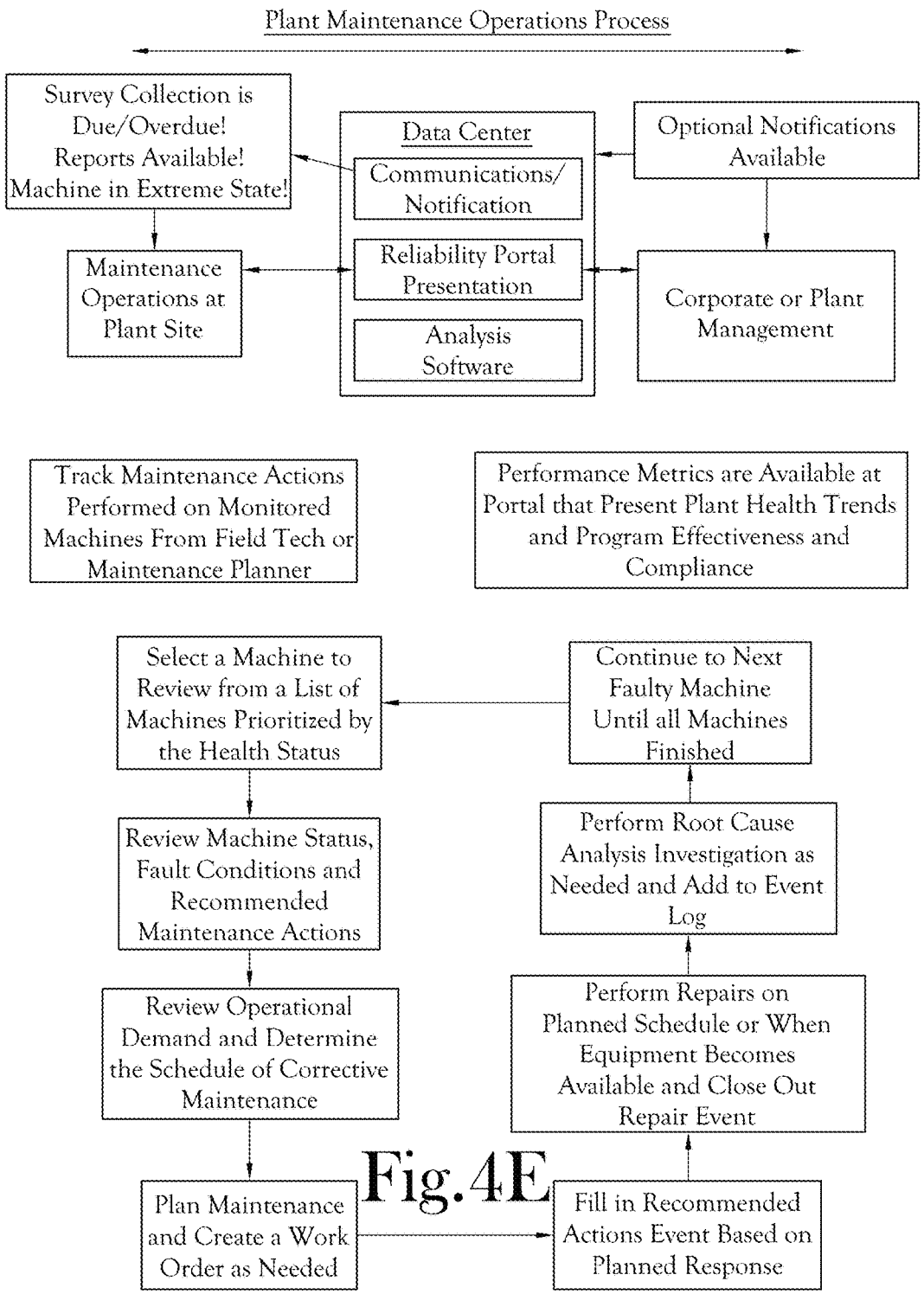
FIG. 4E is a flow diagram illustrating a plant maintenance operations process according to an example embodiment of the present general inventive concept.

Referring to FIG. 4E, the maintenance process begins with a notification to the maintenance planner that new health status information is available which identifies the recommended maintenance actions to be performed. In these cases, the maintenance planner can review plant demands, available parts, and available skilled labor in order to schedule the work to be done and to assign a work order number. This information may be entered into the maintenance action event tracker in order to keep the analyst aware of when a repair action is expected, completed, and any findings or impact of performing the action. This information can also be presented on the web reliability portal as program metrics which document the effectiveness of the program.

Generally, a technician using a field inspection device to gather vibration data relating to the performance of a machine will proceed according to a predetermined route and method as illustrated in FIG. 4D. For example, the operator may proceed through a plant or industrial site to test various machines. When approaching each machine to be inspected, the operator generally gathers vibration data from several locations on the machine using a sensor to record vibration data from various locations on the machine. A data acquisition unit collects vibration data measurements from the sensors at each location of the machine(s)-under-test.

A primary responsibility of the field technician who collects the vibration data is to collect supplemental information that can greatly assist the analyst in evaluating the health of a machine and provide accurate recommended actions for the maintenance planner. This may include making a physical inspection of the machine, acquiring additional information related to the design of machinery components or verifying the accuracy of information in the PdM database, or documenting something unusual about the test conditions or the operation state of the monitored equipment or neighboring machinery. Also, the field technician may elect to collect additional measurements that he believes will help the analyst, or special test measurements that were previously requested by the analyst.

Previously, many PdM programs were executed by in-house staff or, in some cases, the roles of the analyst and the field technician were performed by the same person. Under these circumstances, the supplemental information acquired while collecting data was handled in a rather informal manner because of the close proximity of those executing the program. These known vibration data collectors typically allow the field technician to select from a list of predefined notes or to create notes by typing in the text which are logged with the machine and can be viewed in the analysis software upon request. However, these systems have not progressed beyond this point for at least the following reasons. Firstly, many PdM programs made little use of the feature, electing in most case to communicate orally, because the PdM team was small and the individuals were in close proximity to one another. Secondly, vibration data collectors have not had the ability to make complex note observations such as voice recordings, photographs, or video recordings. Most known vibration analyzers used in PdM applications have very limited text input capability making even the entry of text very laborious. Thirdly, the spread of world networks has made possible instantaneous communication between analyst and field technician using the same software used to transport vibration measurement data.

In contrast, the example embodiments of the present general inventive concept provide a two-way or multi-directional communication system which enables the exchange of collected vibration data and the exchange of various additional information related to the collected vibration data, including, but not limited to, voice recordings, sound recordings, photographs, video recordings, predefined notes, freeform notes, document images, text documents, emails, fax, telephone, or other types of exchangeable information (collectively referred to herein as "complex notes") between one or more field technicians, remote analysts, and/or other parties such as plant managers, maintenance personnel, and the like. In some embodiments, the complex notes are combined with and/or linked to vibration data collected for a particular machine or for a particular location on a machine. For example, the complex notes and the vibration data can be assembled in one or more data packets, to be transmitted and received between field technicians, analysts, and other parties or subsystems across a local or remote communication network, such as the internet, LAN, cellular methods, or other communication systems. However, the present general inventive concept is not limited to any particular mode of data transfer, and various known or later developed data transmission protocols, including data streaming, data packeting, or others, can be used without departing from the broader scope and coverage of the present general inventive concept. Such data can be transmitted to various data collection and analysis nodes, including data storage centers and automated data analysis subsystems, and the present general inventive concept enables the field technician and remote analyst (and/or other authorized parties such as a plant safety supervisor) to exchange instructions, observations, recommendations, emails, and other complex note information across the network in both directions.

The techniques and components of the present general inventive concept enable PdM programs to be executed with teams that are geographically distributed in order to more cost-effectively bring machine data to the diagnostic expert rather than bringing the diagnostician to the machine. For example, embodiments of the present general inventive concept can increase the ability to transfer non-numerical information between analysts and field technicians in both directions to ensure that this information will be seen by the other party. This increases the quality of the data that can be exchanged and reduces the chances that this information may be accidentally overlooked so the information is addressed with proper urgency. Information can be prioritized to better ensure it is considered and acted upon with the proper urgency.

In order to better leverage the talents of expert analysts, embodiments of the present general inventive concept no longer require the practice of bringing an analyst to a troubled machine to perform costly diagnoses. Embodiments of the present general inventive concept enable data and information from a troubled machine to be communicated to the analyst; and not just any analyst, but analyst(s) most knowledgeable on a particular class of machine(s). The opportunity for collaboration and review among a team of analysts increases the probability of consistent, top-quality analysis for the machines in the PdM program. Such an inventive system does not depend upon traditional ad hoc verbal or written communication methods between members of the team. Embodiments of the present general inventive concept provide a new generation of analysis software, communication and notification applications, web presentation portals, and PdM analyzers which exchange data and information between all interested parties in a timely manner. The closed-loop nature of the communication system enables the delivery, acknowledgement and feedback of information between team members to improve effectiveness.

The process of recording physical machine inspections while collecting data with test equipment such as a vibration data collector has heretofore been difficult to achieve due to the nature of the data collection process. The systems and methods of the present general inventive concept can leverage the five senses to yield a wealth of information in a structured program. Such physical inspections and observations can identify issues that may be precursors to deteriorating machinery health as well as existing issues that need to be corrected. A typical list of conditions that can be evaluated when a machine is examined include: (1) Safety Conditions; (2) Modifications or As-Found conditions of significance; (3) Cleanliness; (4) Condition of consumables (oil, filters, etc.); (5) Integrity of base or structure supporting the machine; (6) Missing or broken parts; (7) Leaks; (8) Unusual noises; (9) Unusual smells; and (10) Unusual operational conditions.

In some cases, it may be important to have a specific checklist associated with individual machines or categories of equipment in order to ensure that important issues are not overlooked during the inspection. On occasions, it may be important to supplement the senses of the inspector with simple instruments such as a stethoscope, a stroboscope, a point radiometer, or an ultrasonic instrument. Predefined notes are organized to expedite finding the specific notations that match the field conditions encountered. Entering text on vibration analyzers which do not have full keyboards can be very tedious and discourages the technician from giving full explanations of what he is finding.

When the analysts and field technician are separated geographically, it is important that information collected on the plant floor be communicated to the analyst using more sophisticated and structured methods. The loss of this on-site information in prior art systems has been one of the major obstacles to assigning different people to collect the data and perform the diagnostic analysis.

Using the systems and methods of the present general inventive concept, it is possible for a field technician to generate a flagged complex note, or a complex note that indicates machine conditions that warrant prompt attention or otherwise facilitate correct analysis of test data. In this case, the complex communication system enables the field technician to generate complex notes with predefined priorities, which the complex communication system software directs to other users (besides or in addition to the analyst) over the network, such as a diagnostic center administrator or a plant safety supervisor. Such predefined priority complex notes allow a field technician to alert a diagnostic center administrator or a plant safety supervisor quickly to issues that require prompt attention or an analyst to support quality diagnosis of machine condition.

Embodiments of the present general inventive concept also allow a field technician to receive complex notes that enhance the field technician's ability to do a thorough job. For example, when a field technician indicates, through his or her hand-held device, that the field technician is about to begin testing or data acquisition for a particular machine, the complex communication system sends the field technician a report on the most recent diagnostic evaluation of that machine and a report on the most recently observed status of the machine. These reports can alert the field technician to pay particular attention to certain aspects of that machine's operation, or pay particular attention to specified locations on that machine.

Referring to FIGS. 4B-4E, embodiments of the present general inventive concept provide a remote diagnostic center which receives data and information from one or more portable or installed online vibration analysis units that are located at one or many machine sites and alerts one or more remote analysts that data is ready to be analyzed. The data center is configured to receive, store, and provide secure backup for all data and information received from one or more vibration analysis units located at any location with access to the internet. The data center can execute communication and notification software, database management software, analysis software, and portal presentation software to enable one or more remotely located analyst to review and collaborate on the data from the same machine and monitor and report to a diagnostic center manager whether the data received on a machine is being processed by an analyst and is likely to be completed within a specified interval specific to the machine. The data center communications and notification software can monitor for the receipt of prioritized data and can notify the diagnostic center manager and/or one or more remote analysts of the need for priority review and report on a reduced time schedule.

The communications software in the remote diagnostic center can alert a remote field technician that data from a specified set of machines is due or overdue for collection of the routine specified data and notifies diagnostic center manager and the technician's manager when this scheduled data collection is overdue. The notification methods can be accomplished by any available means including, but not limited to, pagers, email, test messages, or automated voice phone calls.

The analysis software used by the remote analyst can alert the analyst to the presence of complex field notes and/or special test data on a machine-under-scrutiny and force acknowledgement before the analysis report on this machine can be completed. The analysis software can allow the analyst to construct requested action notes to be executed by the remote field technician.

The communication and notification software in the remote diagnostic center may present an operational dashboard that reports which remote analysts are actively analyzing data and for which plant and machine and which analysts are not active and that is accessible over the internet via a web browser. The operational dashboard may identify the state of scheduled data collection for all plants being monitored at the data center and identifying machines or routes of machines that are due or overdue for routine data collection and that is accessible over the internet via a web browser.

The operational dashboard can identify the remaining time in the response commitment of all prioritized requests for the analysis of data received for machines and if the data is being currently analyzed and that is accessible over the internet via a web browser, as well as estimate the current total analysis workload for all data received for analysis and the currently available capacity of available analysts and identify the capacity surplus or shortfall. The dashboard may also present the workload of each analyst and the current analysis demand for his assigned accounts both in total machines to analyze and machines to analyze per hour and that is accessible over the internet via a web browser.

In some embodiments, the communication and notification software in the remote diagnostic center may generate new alert messages to the assigned remote analysts and the diagnostic center manager at a set of checkpoints and at specified percentages of the commitment response time that has elapsed for both routine and prioritized data. The communication and notification software may also generate alert messages to a maintenance planner that machines in his plant have been reviewed and that reports identifying their health status and recommended maintenance actions are available on the presentation portal accessible via web browser.

The analysis software can generate events to be tracked for each new recommended maintenance action resulting from a final reviewed analysis of the recently received data. This basically forces the analyst to review and acknowledge any open maintenance events before he can complete his review and report on the machine.

The presentation portal software in the remote diagnostic center may provide the ability for a maintenance planner, via a web browser, to review or download the requested maintenance events, to create new maintenance events to be tracked, and to provide follow-up information related to each event until the event is closed out, and it may provide the ability for a field technician, via a web browser, to review or download scheduled data collection routes, and to upload data stored in the vibration analyzer device to the data center for review by a remote analyst.

The communication and notification software in the remote diagnostic center may provide the capability for the database in a vibration analyzer device to replicate with a master database in the data center, whenever the device has access to the internet under either manual or programmatic control so that any changes to the content of either database can be identically represented in both locations.

Figure 5:
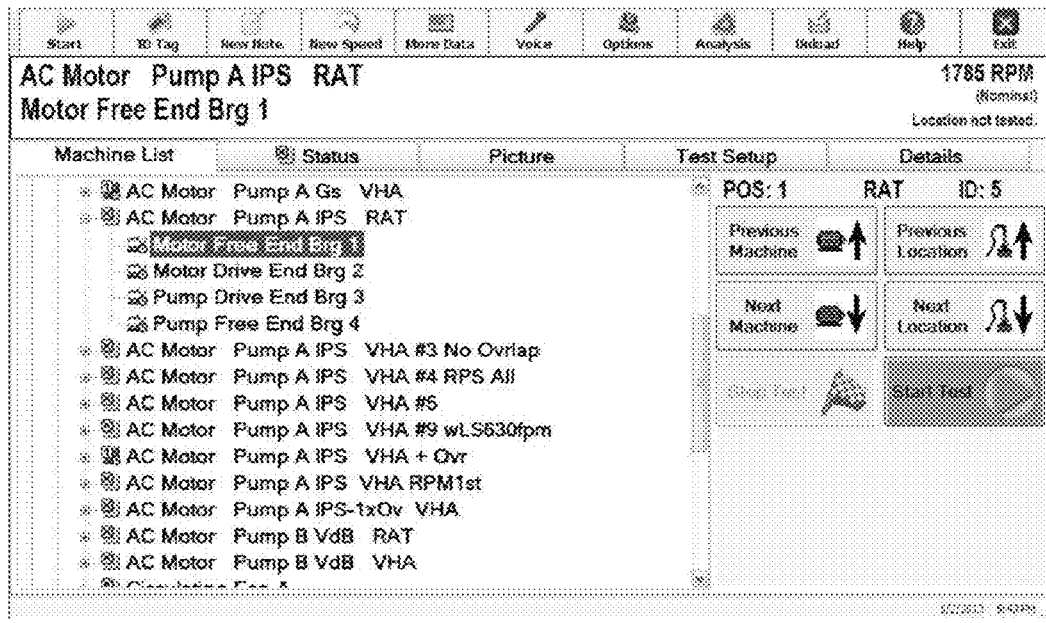
FIG. 5 illustrates a screen shot of a menu display according to an example embodiment of the present general inventive concept wherein a field technician navigates to machines and measurement locations on the route has ready access to a New Notes function where he can compose complex field notes based upon a physical inspection.

During the process of collecting data, the field technician navigates from one machine to the next and to each of the predefined test locations on that machine. FIG. 5 illustrates a screen shot of a menu display according to an example embodiment of the present general inventive concept enabling a field technician to navigate along the data collection route and illustrates immediate access at any location to the New Notes function. When executed, any complex notes created are automatically assigned to the machine currently selected for testing.

In some example embodiments, complex notes include predefined notes, which a field technician generally selects from a list or menu. This is the fastest method for identifying field observations in a standardized manner that can be automatically interpreted by the analysis software. Thus these predefined notes are highly structured into categories to facilitate locating a specific condition and provide thorough coverage for most conditions which may be encountered during the inspection process.

Figure 6:
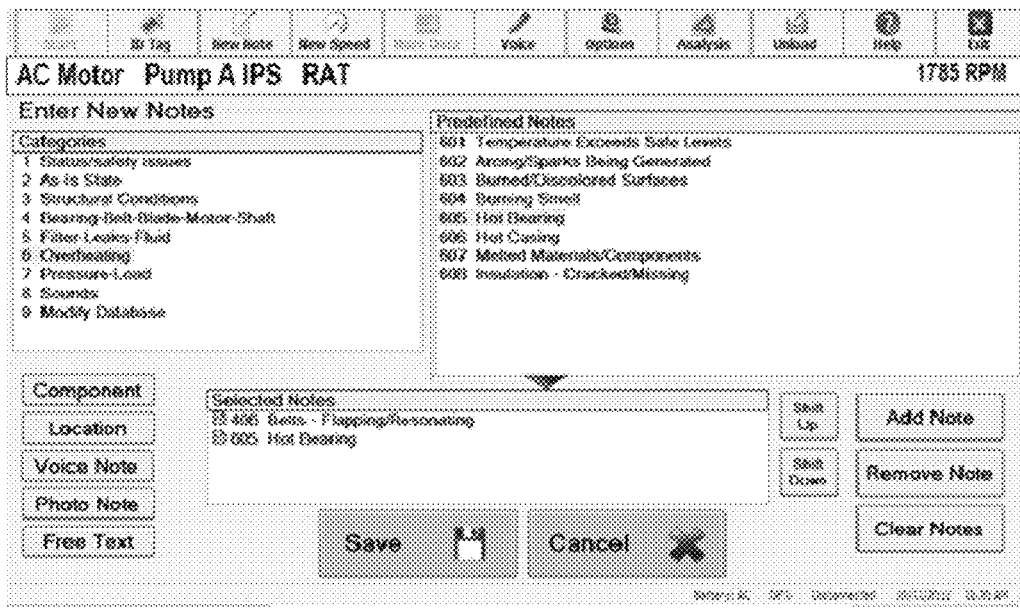
FIG. 6 illustrates a screen shot of a menu display according to an example embodiment of the present general inventive concept enabling a field technician to select one of a number of predefined notes.

FIG. 6 illustrates a screen shot of a menu display according to an example embodiment of the present general inventive concept enabling a field technician to select one of a number of predefined notes related to the condition of a machine. Examples of predefined notes, in some embodiments, include "Hot Bearing," "Unsteady Operation," "Broken Gauges," or "Noise Exceeds Safe Levels."

Figure 7:
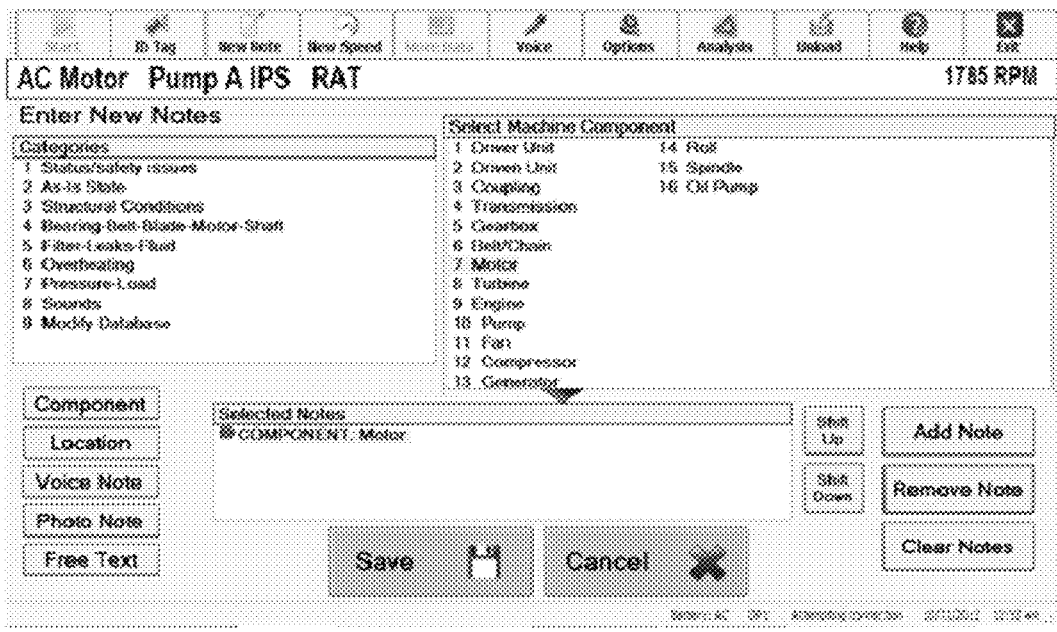
FIG. 7 illustrates a screen shot of a menu display according to an example embodiment of the present general inventive concept wherein a field technician can assign one or all of the observations in a complex note to specific component of the machine from a list.
Figure 8:
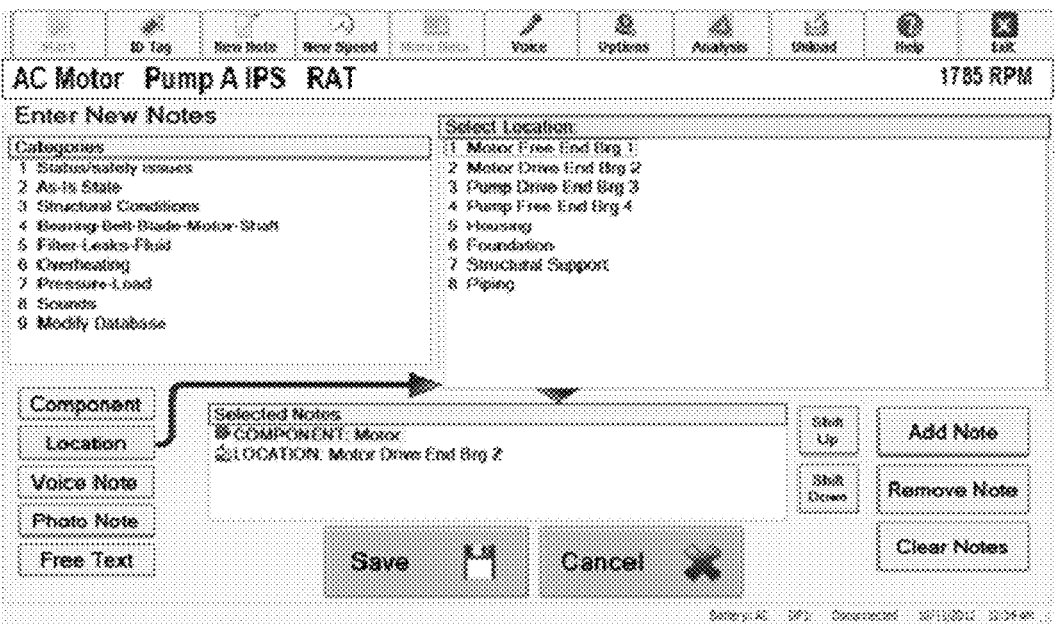
FIG. 8 illustrates a screen shot of a menu display according to an example embodiment of the present general inventive concept wherein a field technician can assign one or all of the observations in a complex note to specific location on a component of the machine from a list.

In some cases, the conditions encountered may be specific to only one of the components on the machine, such as the motor, fan, or pump. FIG. 7 illustrates a screen shot of a menu display according to an example embodiment of the present general inventive concept wherein a field technician selects a specific component from a list to more specifically define the condition being documented. Additionally, it may be important to identify a location on the machine or component associated with the identified condition. As an example, it would be very important to identify the specific bearing of concern if a "Hot Bearing" note had been selected. Similarly, FIG. 8 illustrates a screen shot of a menu display according to an example embodiment of the present general inventive concept wherein a field technician selects a specific location from a list to identify where the condition was observed on the machine component.

Figure 9:
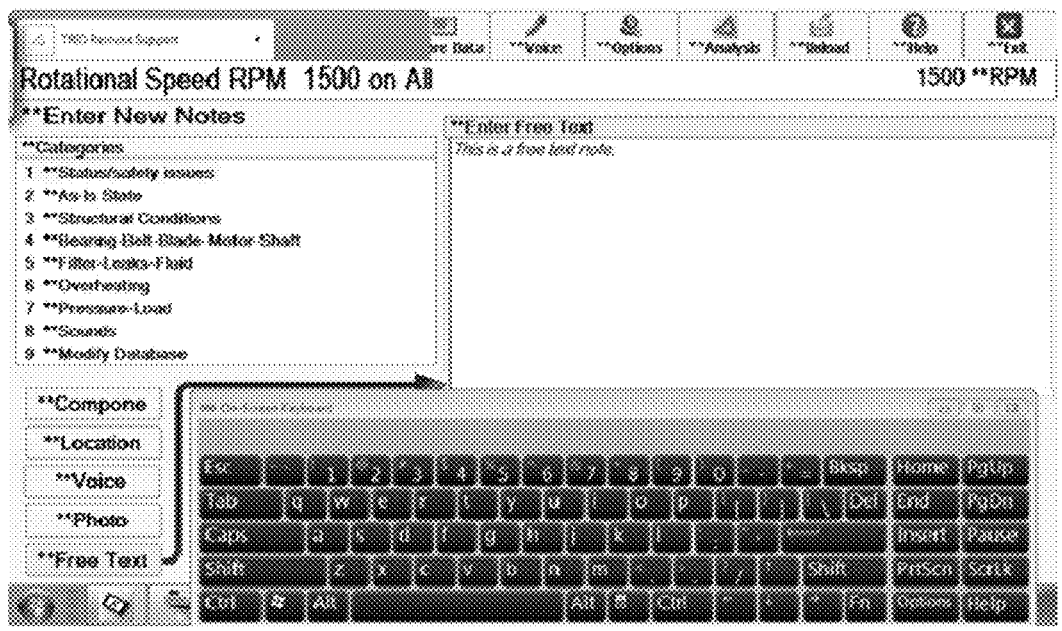
FIG. 9 illustrates a screen shot of a menu display according to an example embodiment of the present general inventive concept enabling a field technician to enter freeform (or non-predefined) notes—or "free text" notes—for a machine or machine location.

In some example embodiments, complex notes include "freeform" or "free text" notes, which a field technician generally types using a keypad or a displayed keypad on the hand-held device. These notes can alternately be handwritten. FIG. 9 illustrates a screen shot of a menu display according to an example embodiment of the present general inventive concept enabling a field technician to enter freeform or free text (or non-predefined) notes for a machine or machine location; in the illustrated example embodiment, the display screen (or touch-screen) for the hand-held device displays the keypad along with the menu page.

Figure 10:
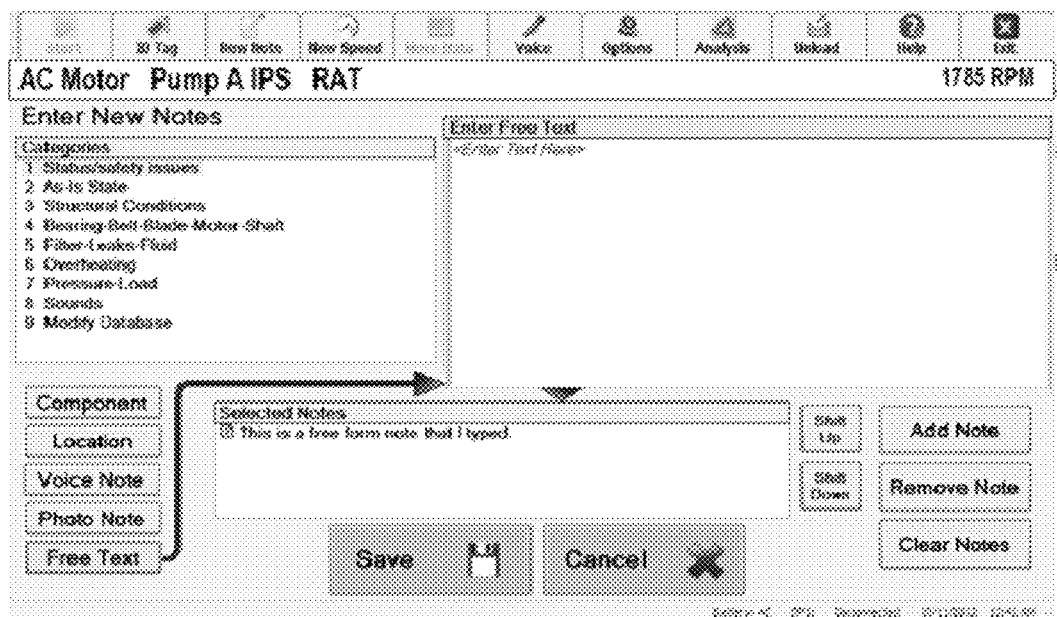
FIG. 10 illustrates a screen shot of a menu display according to an example embodiment of the present general inventive showing where a freeform or "free text" note has been recorded for a specified machine or machine location.

FIG. 10 illustrates a screen shot of a menu display according to an example embodiment of the present general inventive concept showing where a freeform or free text note is being recorded for a specified machine or machine location.

(Proposed—In some example embodiments, complex notes include a real-time text/voice/video conversation between an analyst and field technician, coupled with mutual access to shared test data.)

In some example embodiments, complex notes include voice notes recorded by the field technician through the hand-held device or another component.

Figure 11:
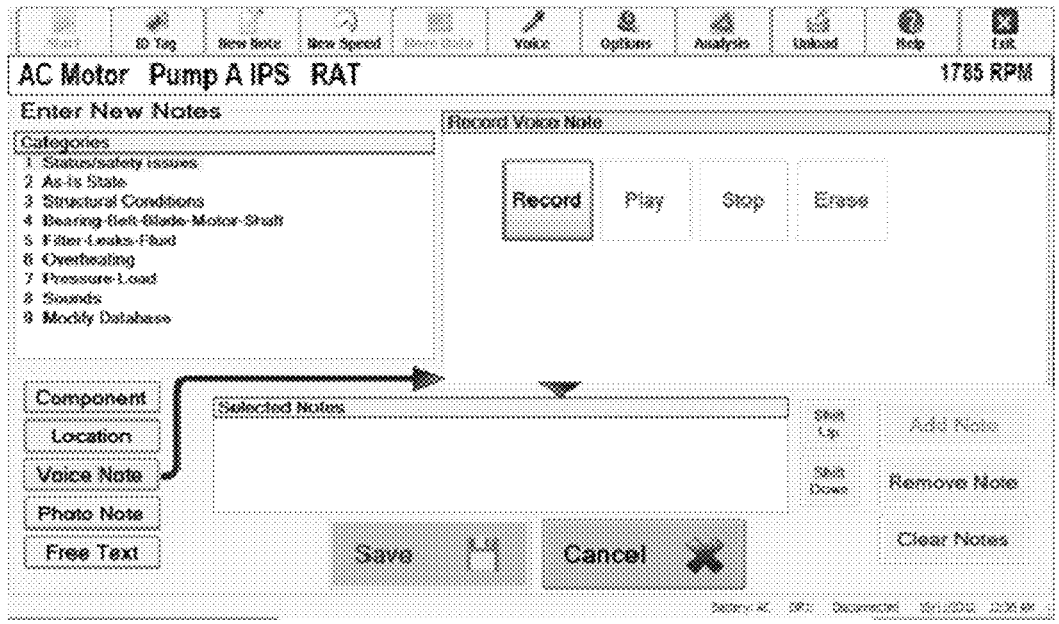
FIG. 11 illustrates a screen shot of a menu display according to an example embodiment of the present general inventive concept enabling a field technician to record a voice note for a machine or machine location.

FIG. 11 illustrates a screen shot of a menu display according to an example embodiment of the present general inventive concept enabling a field technician to record a voice note for a machine or machine location.

In some example embodiments, complex notes include photographs that the field technician takes of the machine to illustrate some aspect of the machine status or condition.

Figure 12:
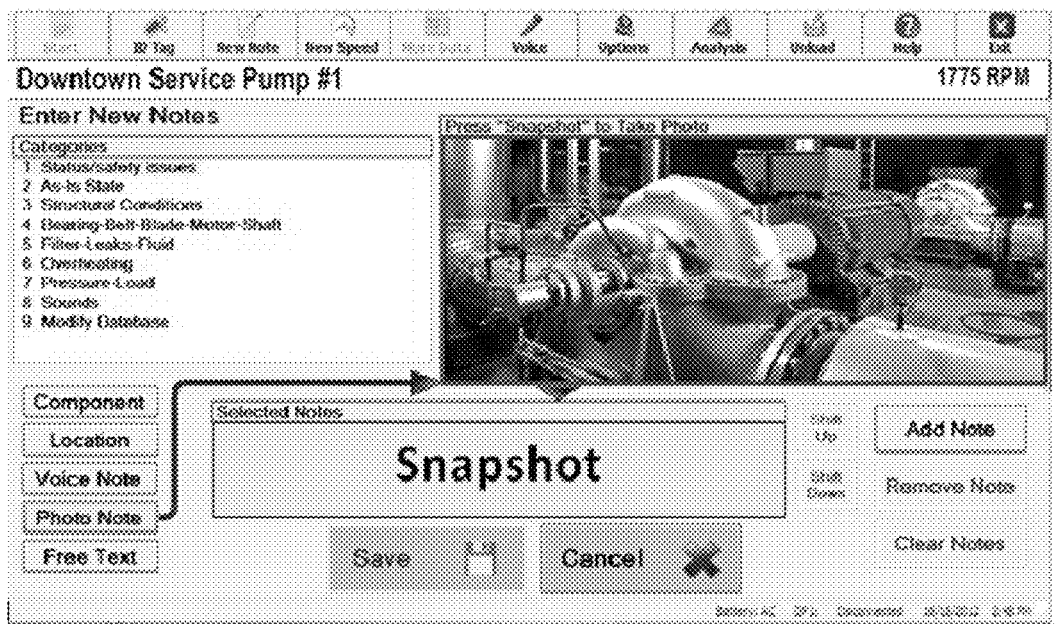
FIG. 12 illustrates a screen shot of a display according to an example embodiment of the present general inventive concept enabling a field technician to take a photograph or "snapshot" of a machine or machine location, with the photograph being incorporated into the complex notes for said machine or machine location.

FIG. 12 illustrates a screen shot of a menu display according to an example embodiment of the present general inventive concept enabling a field technician to take a photograph or "snapshot" (or "Photo Note") of a machine or machine location, with the photograph being incorporated into the complex notes for said machine or machine location.

In some embodiments, complex notes are automatically generated when the field technician gathers additional test measurements for a particular machine.

Figure 13:
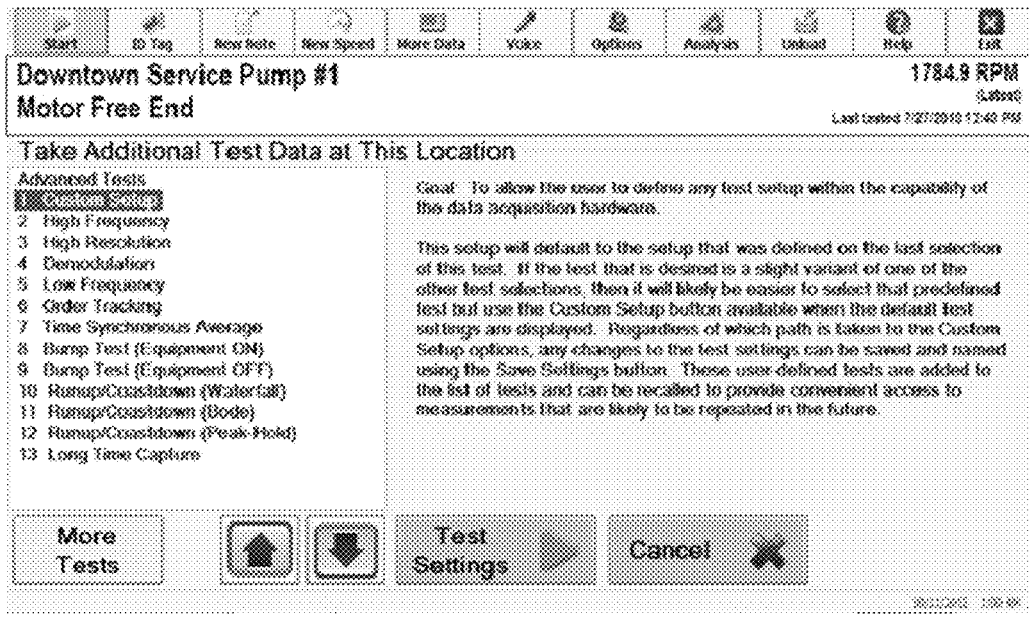
FIG. 13 illustrates a screen shot of a menu display according to an example embodiment of the present general inventive concept illustrating special test measurements which can be selected by the field technician to collect additional measurements for a machine location.

FIG. 13 illustrates a screen shot of a menu display illustrating special test measurements which can be selected by the field technician to collect additional measurements for a machine location. The vibration data collector software automatically generates complex notes identifying any additional measurements collected.

Figure 14:
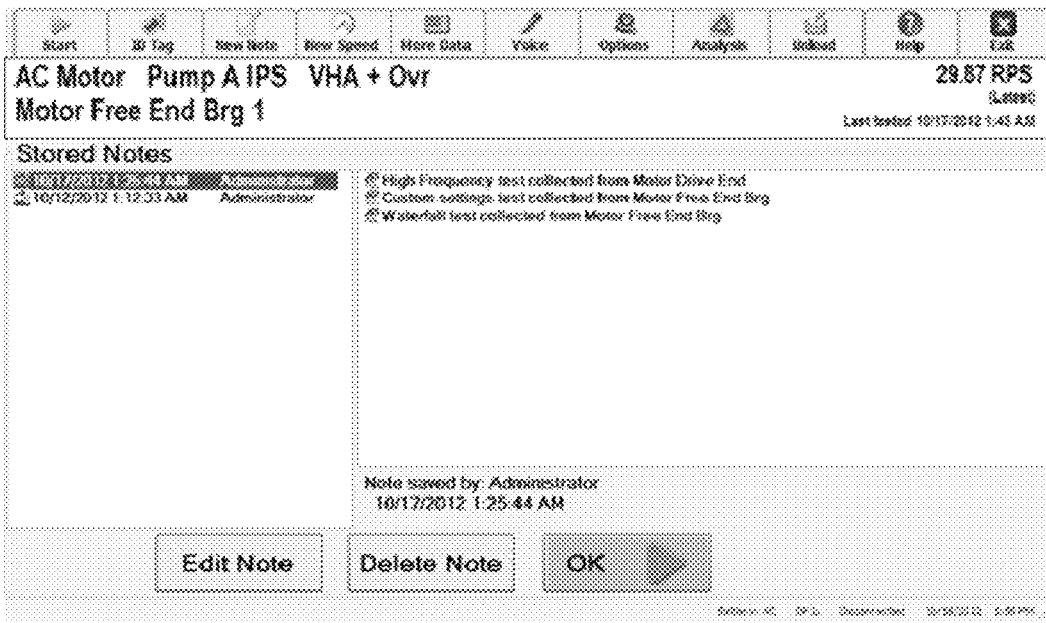
FIG. 14 illustrates a screen shot of a display according to an example embodiment of the present general inventive concept showing wherein a field technician has collected special test measurements for a machine or machine location and the vibration data collector software has automatically generated complex notes identifying the measurements collected.

FIG. 14 illustrates a screen shot of a display according to an example embodiment of the present general inventive concept showing wherein a field technician has recorded or generated additional test measurements for a machine or machine location.

The analysis software used by the analyst can flag the presence of these additional special test measurements as he reviews the expert system analysis of the routine test data in the process of diagnosing the condition of the machine and formulating recommendations. The analyst can be required to acknowledge that he has reviewed the additional measurements before the report may be finalized for a particular machine. These automatically generated notations or flagged complex notes can provide an advantage in diagnosing machine conditions and formulating recommendations, since otherwise additional measurements gathered by the field technician are not processed by the automated diagnostic software which screens the routine vibration data and might be overlooked.

Figure 15:
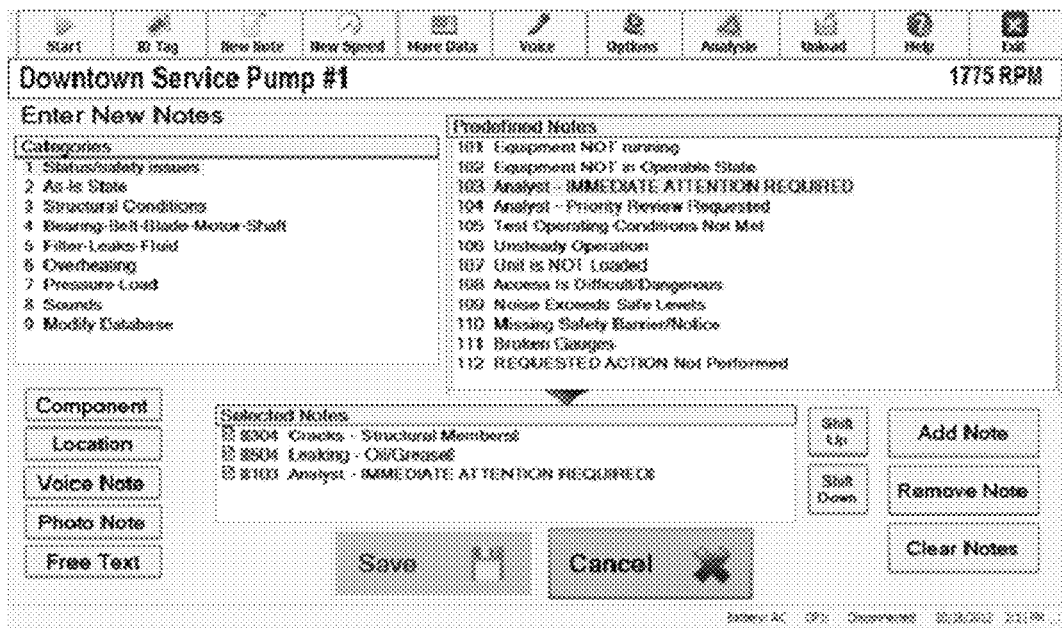
FIG. 15 illustrates a screen shot of a menu display according to an example embodiment of the present general inventive concept enabling a field technician to request immediate analysis by a remote analyst during the process of composing a complex note for a machine or machine location.

Data may be collected on 100 or more machines in an 8-hour work shift. Typically, 80% or more of these machines will be healthy and show no signs of impending failure. Of the remaining 20%, some machines will show some change in their normal behavior but it may be so slight that it is noted but no of consequence and not of reportable significance. However, occasionally dramatic changes occur which are of obvious concern. As in the case of an automobile, the changes in sound or smell indicate the need for immediate attention. The need to get an immediate analysis of this machine can be triggered by adding a prioritization flag to the field notes. In one example embodiment, notes can be tagged with "Analyst—Priority Review Requested" or "Analyst—IMMEDIATE ATTENTION REQUIRED." FIG. 15 illustrates a screen shot of a menu display according to an example embodiment of the present general inventive concept that enables a field technician to prioritize a complex note for a machine or machine location. When the data from the vibration analyzer associated with this flagged note is received at the virtual diagnostic center, a text or email alert is sent to the analyst and the diagnostic center manager identifying the need for priority action. In an example embodiment, the vibration analyzer may have an expert system or another method for immediately screening the collected data and complex notes once all locations have been collected on a machine.

Figure 16:
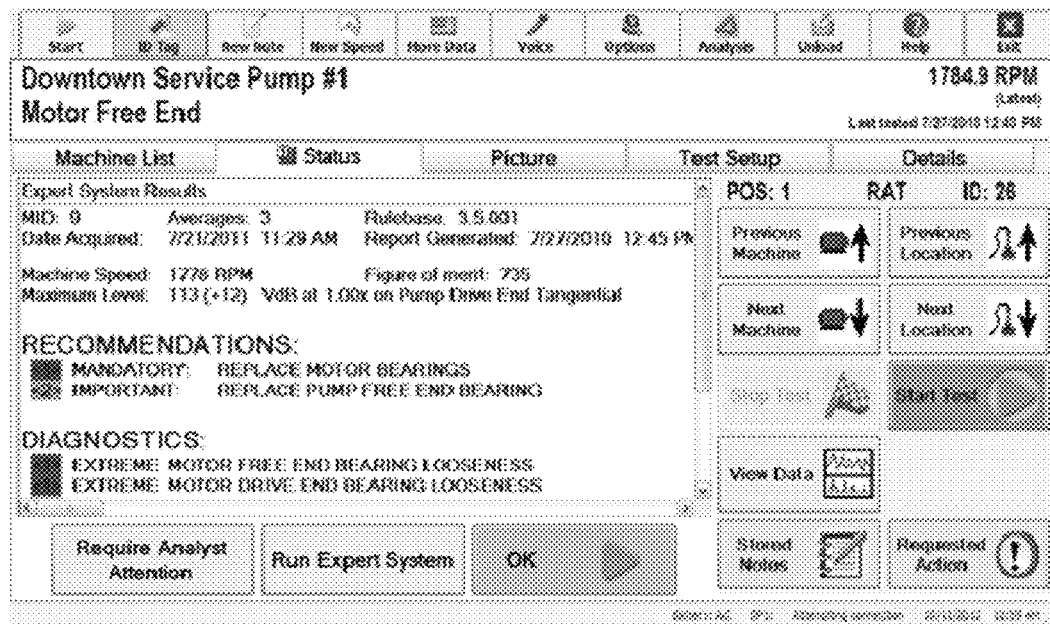
FIG. 16 illustrates another screen shot of a menu display according to an example embodiment of the present general inventive concept wherein a field technician, at the conclusion of data collection on a machine, is presented with a summary diagnosis of machine faults and status via the onboard expert analysis software and has quick access to a button to request immediate attention by a remote analyst.

FIG. 16 illustrates a screen shot of a menu display according to an example embodiment of the present general inventive concept wherein a field technician, at the conclusion of data collection on a machine, is presented with a summary diagnosis of machine faults and status via the onboard expert analysis software in the analyzer and has quick access to a button to request immediate attention by a remote analyst.

The analyst may request that the field technician perform additional task(s) that may help clarify the condition of a machine. Previous PdM analysis software and vibration analyzers made no provision for this operation. The analyst would have to make a phone call, send a text message or email to inform the field technician what task that he wanted performed. In an example embodiment, this operation has provided for the analyst by allowing "Requested Action" notes to be constructed and transferred to the vibration analyzer.

Figure 17:
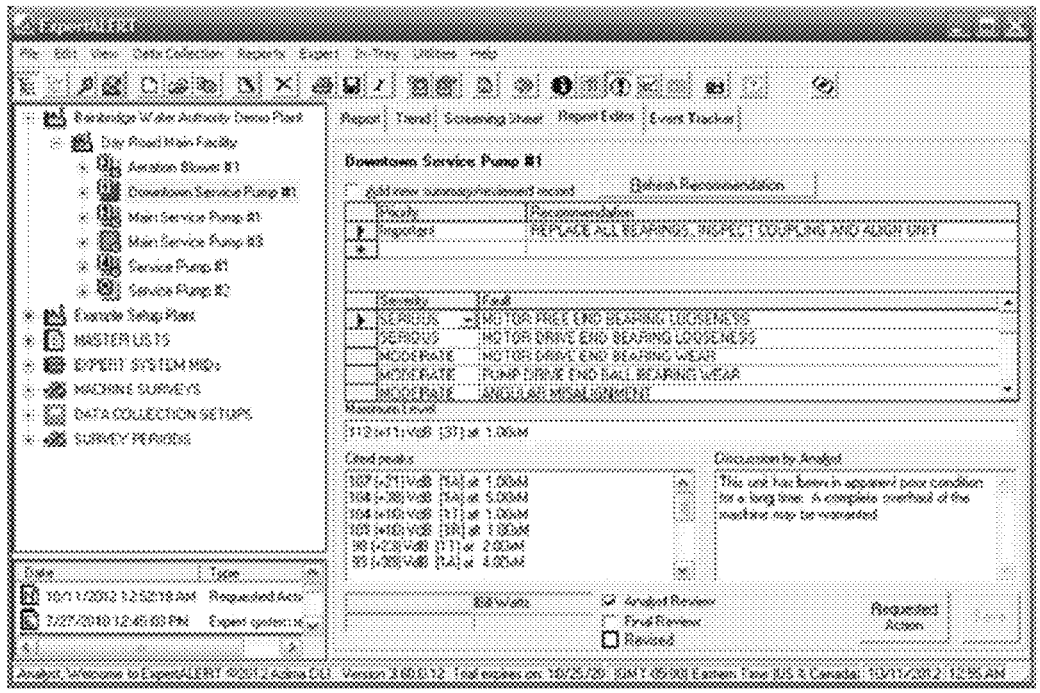
FIG. 17 illustrates a screen shot of a menu display at a diagnostic console according to an example embodiment of the present general inventive concept enabling an analyst as he reviews the diagnostic analysis generated by the expert system in his analysis software to request the ability to add requested actions for this machine to be performed by the field technician.

FIG. 17 illustrates another screen shot of a menu display according to an example embodiment of the present general inventive concept wherein a Requested Action note can be triggered from the diagnostic console in the analysis software. As the analyst reviews the results generated by the automated analysis and begins to modify these results based on his expertise, a Requested Action button is available to trigger the construction of specific tasks to be communicated to the field technician.

Figure 18:
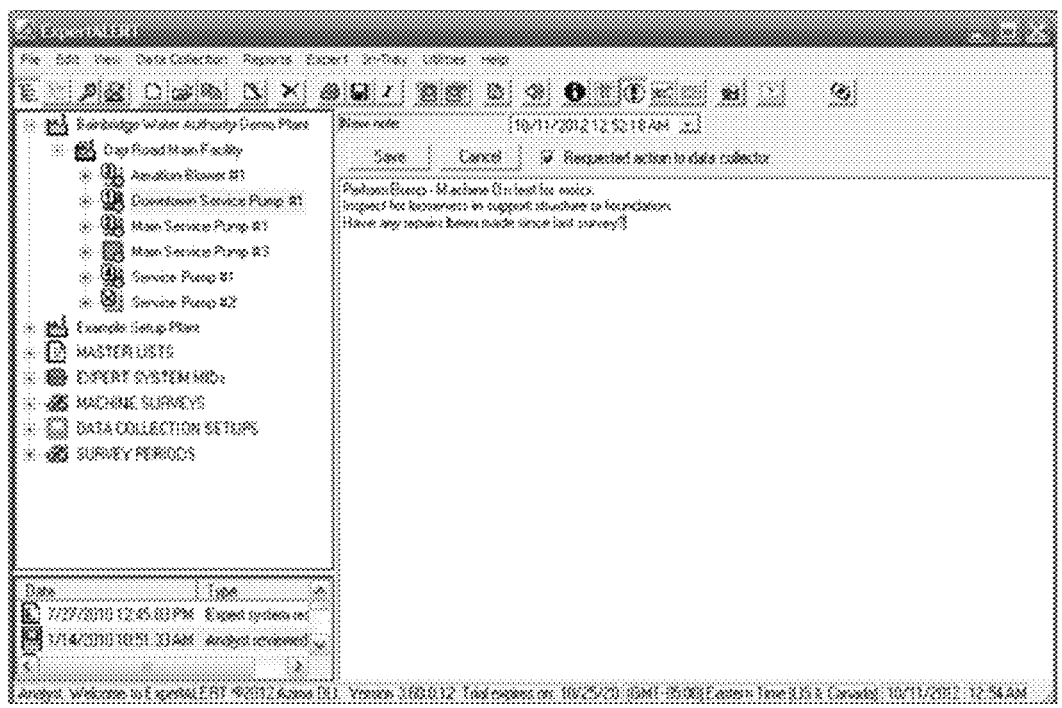
FIG. 18 illustrates a screen shot of a menu display at a diagnostic console according to an example embodiment of the present general inventive concept enabling an analyst to compose the instructions or recommended actions to be sent to a field technician.

FIG. 18 illustrates a screen shot of a menu display according to an example embodiment of the present general inventive concept which illustrate a typical set of actions that an analyst might request the field technician to perform on a specific machine. This information can be transferred to the vibration data collector and each machine which has an associated requested action note is flagged for the field technician. When the field technician attempts to collect any data on this machine, he will be unable to proceed until he views the Requested Action note and acknowledges that he done so.

Figure 19:
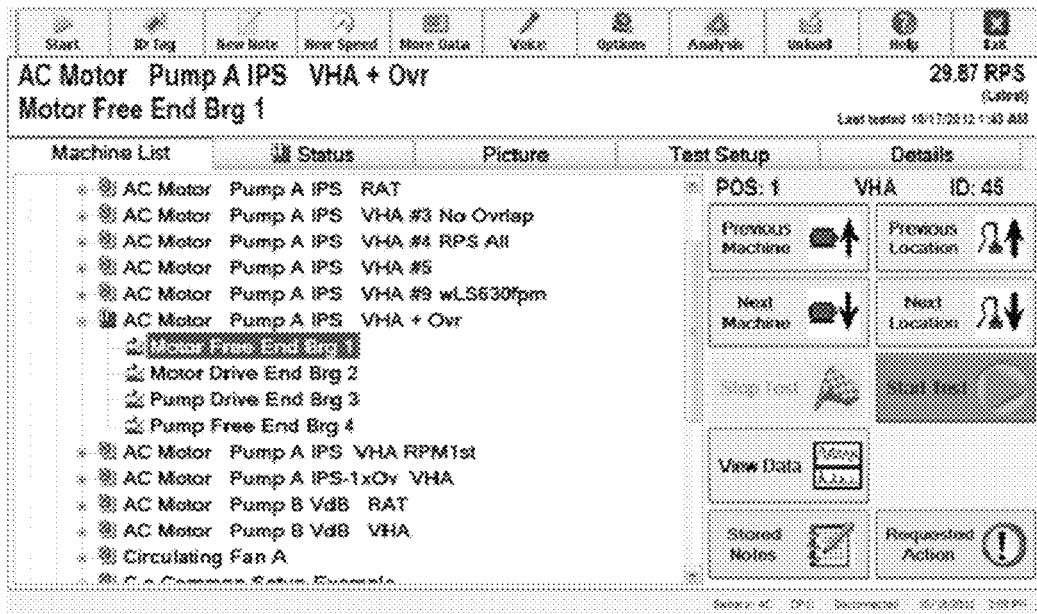
FIG. 19 illustrates a screen shot of a menu display according to an example embodiment of the present general inventive concept wherein a field technician navigates to a machines which has requested actions from the analyst assigned to it flagged to alert the field technician.

FIG. 19 illustrates a screen shot of a menu display according to an example embodiment of the present general inventive concept wherein a field technician selects one of a number of machines or machine components from a list which has an associated Requested Action that has not been acknowledged.

Figure 20:
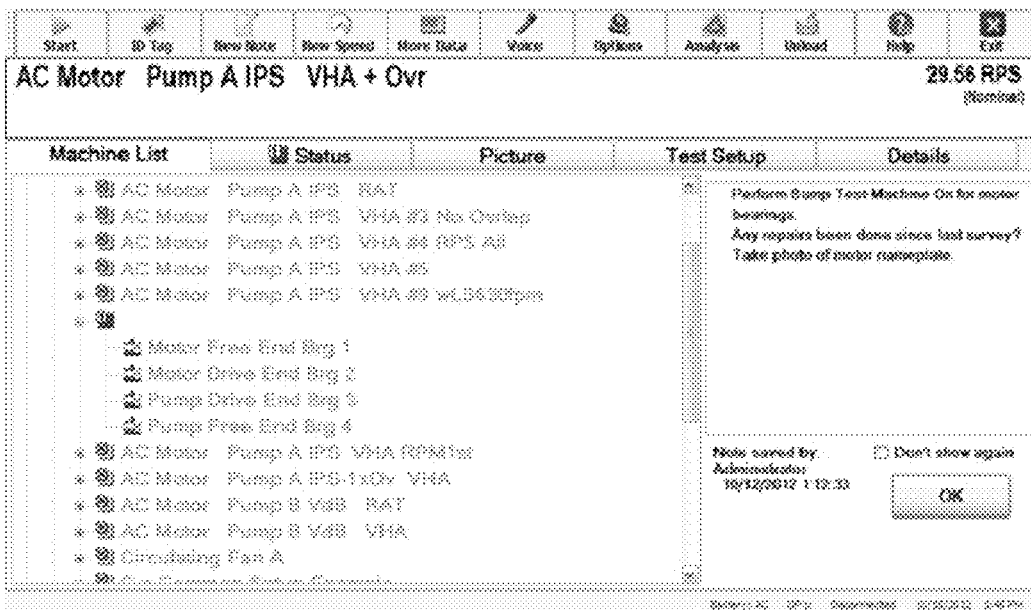
FIG. 20 illustrates a screen shot of a menu display according to an example embodiment of the present general inventive concept wherein a field technician, having selected one of a number of machines or machine components from a list in the screen shown in FIG. 18, receives instructions and task requests from an analyst or from the data center or from the analysis software.

FIG. 20 illustrates a screen shot of a menu display according to an example embodiment of the present general inventive concept wherein a field technician presses the Requested Action button and is presented with the instructions and task requests created by the analyst for this machine.

When an analyst creates the health report for a machine, fault conditions can be identified and their severity along with associated actions recommended to correct the faults can be established. The urgency for performing the recommended action can also be provided. It is important to track these recommended actions to ensure that maintenance work orders are written and executed in a timely manner and that the accuracy of the recommendations is documented and that subsequent measurements confirm the effectiveness of the corrective actions performed. Some of this information is normally logged in computerized maintenance management systems (CMMS) which document the operation of the plant maintenance department. The CMMS is generally located behind firewalls on the plant IT infrastructure and is not available to a remote analyst. The analysis software and Portal software located in the virtual diagnostic center provide a facility for transferring this information between the analyst and other parties at the plant site. The analysis process automatically creates trackable events whenever the analyst finalizes a machine health report containing any recommended maintenance actions. The Portal via a web browser provides a communication channel by which the people involved can track an event from cradle to resolution. The status of an event being tracked is immediately available to the analysis via the diagnostic console in the analysis software. As an example embodiment of the present general inventive concept, maintenance event tracker screens from the software in the diagnostic center illustrate how this closed loop between the analyst and plant maintenance personnel operates.

Figures 21, 22:
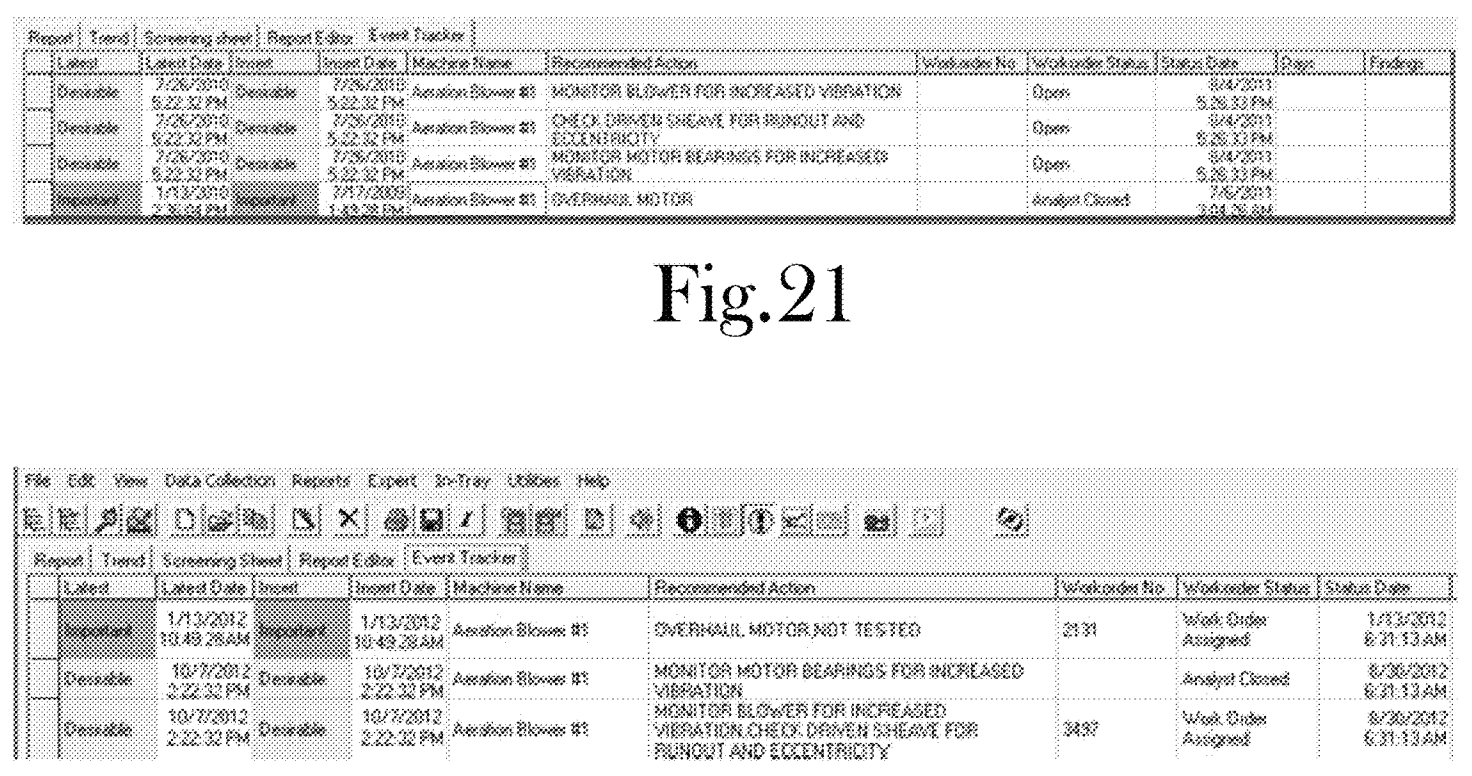

FIG. 21 illustrates a screen shot of a maintenance event tracker screen according to an example embodiment of the present general inventive concept, wherein each recommended action by the analyst automatically creates an event that will be tracked until the recommended maintenance has been performed and has corrected the problem.

When an analyst recommends a particular action (for example, bearing replacement, additional monitoring, etc.), a row is added to the Event Tracker table. This enables the user to see a history of recommendations over time. Once the row is added, other information can be added to track the fault, such as a work order number for the repair, root cause findings, and financial impact. By enabling feedback from the plant maintenance team, analysts can see how the fault ultimately gets resolved and use that information to improve future diagnoses for that particular machine (and other machines of the same make/model).

FIG. 22 illustrates a screen shot of a maintenance event tracker screen according to an example embodiment of the present general inventive concept, wherein the analyst may elect to group multiple recommended actions into one tracked event if it is logical for the recommendations to all be performed concurrently.

Figure 23:
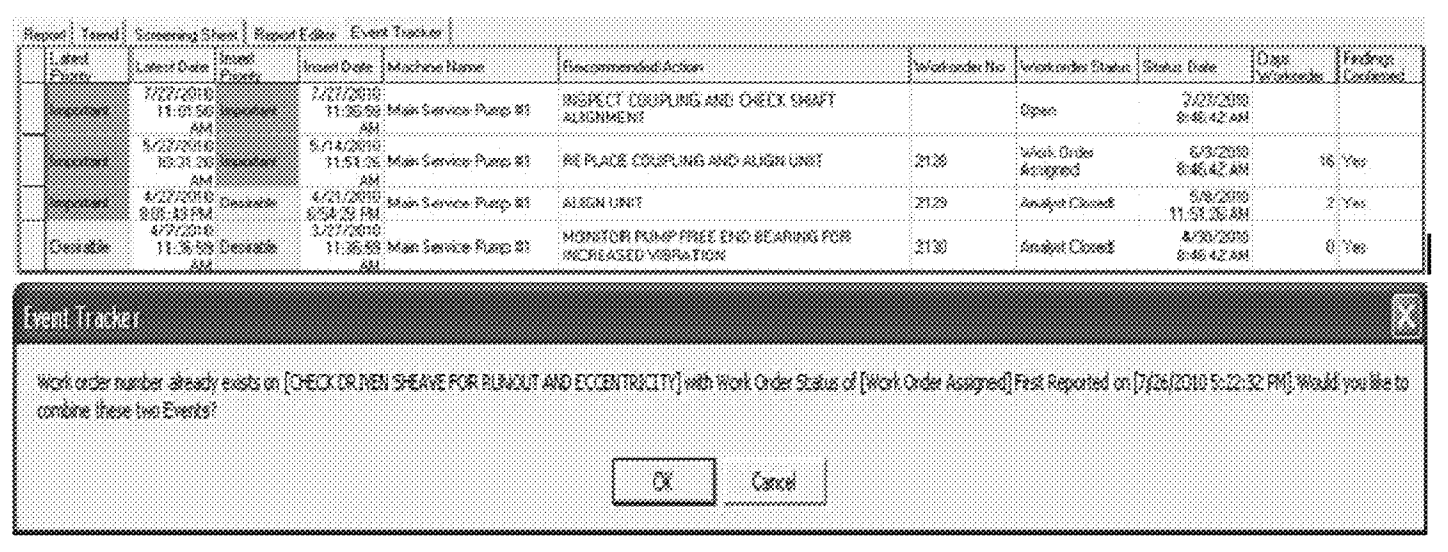

FIG. 23 illustrates a screen shot of a maintenance event tracker screen according to an example embodiment of the present general inventive concept, wherein the maintenance planner can also group individual recommended actions into one event by assigning the same work order number to the separate events.

Figure 24:
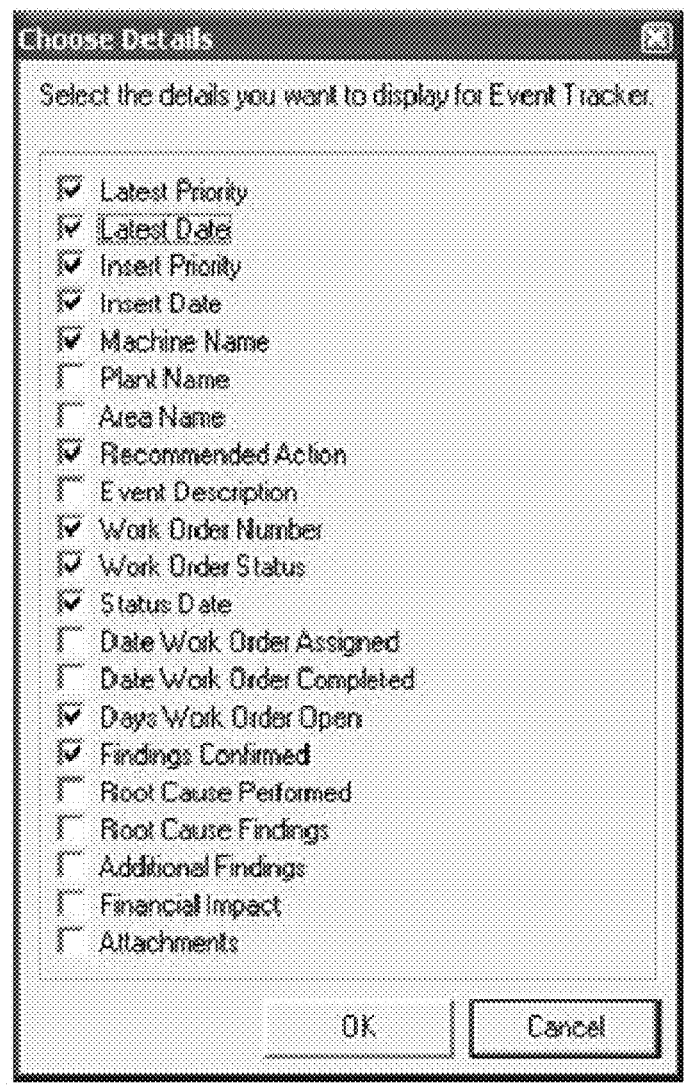
FIG. 24 illustrates a screen shot of a maintenance event tracker screen according to an example embodiment of the present general inventive concept, including a list of fields that are associated with an event, to track, among other things, the timing of the maintenance planned and performed, to verify whether the call was correct, to determine the root cause of the fault condition detected, and to document any financial benefit derived from correcting the fault because of early detection.

FIG. 24 illustrates a screen shot of a maintenance event tracker screen according to an example embodiment of the present general inventive concept, including a list of fields that are associated with an event, to track, among other things, the timing of the maintenance planned and performed, to verify whether the call was correct, to determine the root cause of the fault condition detected, and to document any financial benefit from identified correcting the fault because of early detection.

Referring to FIG. 24, the Latest Priority field can be used to track the importance of the recommended action. The priority can be identified by color, icon, font, or other identifier, as desired. The Latest Date field can be used to track the date of the data used to make the recommendation. This can be the date the data was collected, for example. The Insert Priority field can be used to track the importance of the recommended action when it was first made. The Insert Date field can be the date the recommendation was first made in the Report Editor. The Machine Name field can be the name of the machine for which the recommendation was made. The Plant Name field can be the plant in which the machine resides, and the Area Name field can be the area in which the machine resides. The Recommended Action field can be the action recommended by the analyst. This field can be taken directly from the Report Editor.

In the example Event Tracker, each action recommended appears in its own row in the table. More than one recommended action can be seen if multiple events are merged.

The Event Description field can be used to carry a description of the problem that prompted the recommendation (for example, motor bearing wear).

The Work Order Number field can be the number of the work order that is associated with the recommendation. Typically, this is the same work order number used in the Computerized Maintenance Management System (CMMS). A value appears if the event is edited and a number is entered.

The Work Order Status field can be the status of the work order. For example, when a recommendation is first made, it has a status of Open. Edit the event to change the status. Here, the status options available are: Open, Work Order Assigned, Work Order Deferred, Work Order Completed, Closed, Analyst Closed, Work Order Rejected. It is possible to click a link to see a description of each status.

The Status Date field can be the date the current Work Order Status was specified, the Date Work Order Assigned field can be the date a Work Order Number was entered for this recommendation, and the Date Work Order Completed field can be the date a work order is set to the status of Work Order Completed. This is generally done when the recommended action has been performed per the work order.

The Days Work Order Open can be the number of days a work order has been open. For example, a counter can start when the recommendation is inserted (and automatically set to Open) until it is set to either Analyst Closed or Closed, regardless of any statuses set in between.

The Findings Confirmed field can indicate whether the findings of the analyst have been confirmed. Available options can be Yes, No, or Partial, for example. The Root Cause Performed field can be the date root cause analysis was performed to confirm the analyst's findings, and the Root Cause Findings field can be the root cause of the problem (for example, a lubrication problem). The Additional Findings field can include any additional information entered about the machine. This could be more information about a root cause, details about the work to be done, etc.

The Financial Impact field can be used to track the net gain resulting from the recommendation. This value is the money saved by catching the problem and repairing it (for example, the daily cost of downtime, had the machine failed, minus the cost to repair the problem). The Attachments field can be used to provide access to documents/photos or other files that may be attached to an event.

When editing an event, it is possible to set, or define, the Work Order Status to various values. For example, Open can be used when a recommendation is made via the analysis software, and it can be inserted as an event into the Event Tracker with an initial work order status of Open.

The status can be set to Work Order Assigned when an event is edited and a work order number is entered. The status can be set to Work Order Deferred when a work order exists, but is not being acted on at the current time. For example, if the plan calls for motor overhaul, but the repair will wait until the next machine outage, the status can be set to Work Order Deferred.

The status Work Order Completed can be selected when the repairs outlined on the work order have been completed. For example, once repairs are made and the work order is deemed complete, the work order can be reviewed and set to Closed.

The status Analyst Closed can be set if new data is collected for a machine that previously had a recommendation, but the problem no longer exists. Here, the Event Tracker can automatically set the status to Analyst Closed, and can remove the event from the default table view.

The status Work Order Rejected can be used when it is deemed that the recommendation does not require any work or that the user is choosing to ignore it. This will remove the event from the default table view.

Figures 25A, 25B:
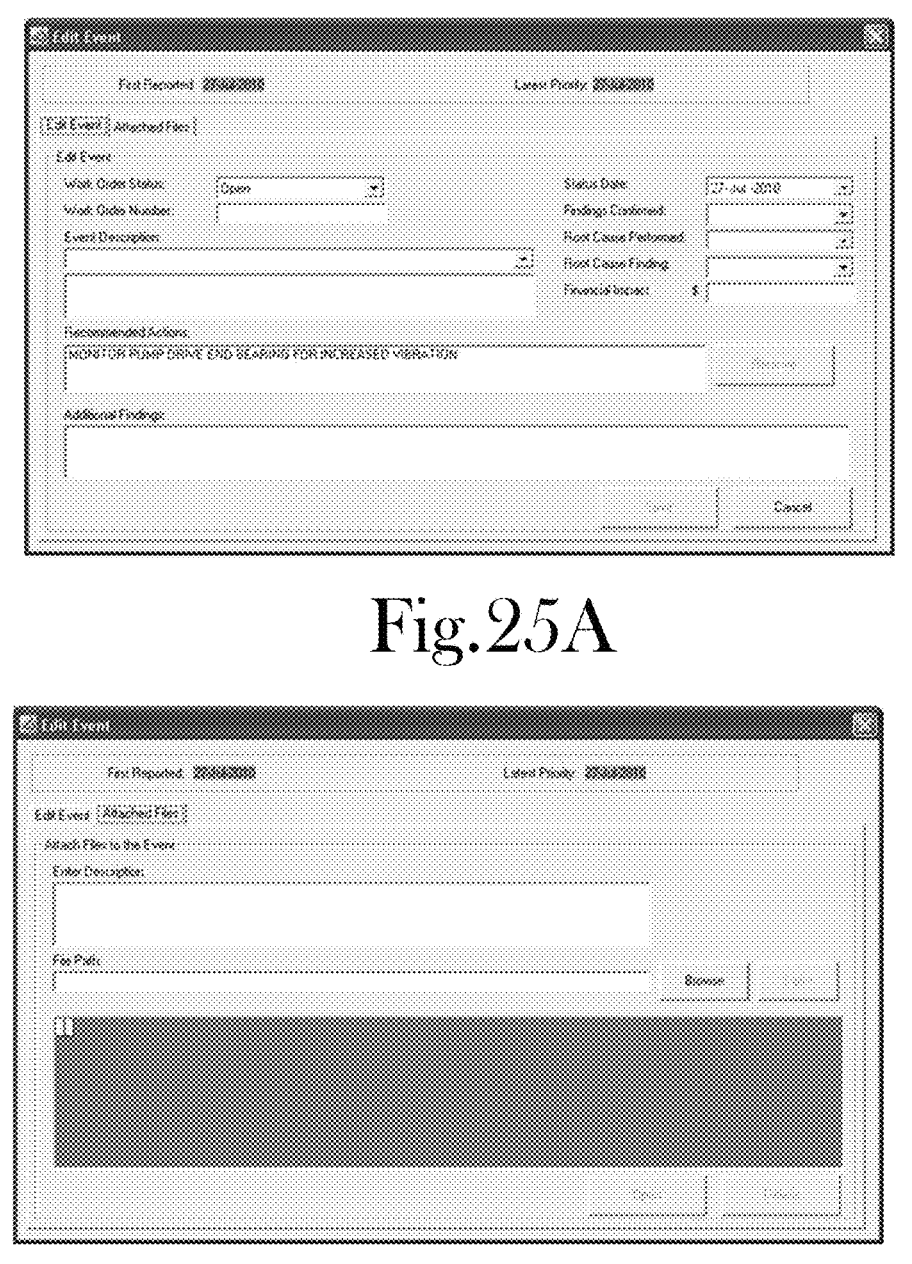

FIGS. 25A and 25B illustrate screen shots of maintenance event tracker screens according to an example embodiment of the present general inventive concept, including event screens available via the Portal that allow the plant maintenance personnel to provide feedback on each event and close it out when the condition is corrected.

The Event Tracker can provide an efficient method for improved exchange of information and coordination of activities when responding to high impact maintenance events. In this embodiment, the feedback provided by maintenance personnel via the Event Tracker will significantly enhance the effectiveness and benefits of the PdM program. The Event Tracker can thus help the maintenance department keep track of their work in response to recommended actions, while also providing analysts valuable information about the root causes that initiated the problem in the first place. Plant personnel can use as many or few of the fields in the Event Tracker as meet their needs.

The following examples are included merely to demonstrate ways embodiments of the Event Tracker can benefit a PdM program, and should not be interpreted as limiting the scope of the present general inventive concept.

Example 1

Instead of treating each machine's issues as isolated events, the Event Tracker helps maintenance teams track root causes of machine faults that may have a plant-wide impact on machinery. A plant has several of the same machines that are used for a common purpose. Over time, each of these machines develops a bearing problem, which is detected and reported by the analyst. In each case, the maintenance team determines root cause is a lubrication issue. By entering this root case in the Event Tracker, it becomes evident that the same lubrication issue is causing widespread bearing issues. The maintenance team can then evaluate whether the wrong lubricant is being used or whether it is being applied incorrectly.

Example 2

Upper management typically only sees the cost associated with fixing a problem. The Event Tracker provides a means to track the net gain to the company, by showing how much was saved by early detection/correction. Most Computerized Maintenance Management Systems (CMMS) track the cost to repair a machine, but do not provide the net gain to the company with regards to avoided production/downtime losses. By entering the CMMS work order number into the Event Tracker and entering a financial impact value, plant personnel can track the net gain to their company. This information—the cost saved by the diagnosis—can be invaluable when justifying their PdM program funding to upper management.

Example 3

The Event Tracker serves as a way for the maintenance team to provide feedback to the analyst regarding the actions taken in response to the analysts's recommendations. For example, an analyst makes a recommendation on a machine and then sees the problem still exists the next time data is collected (for example, 30 days later). Without the Event Tracker, the analyst has no way of knowing whether work was done after the initial recommendation was made and this is a reoccurrence, or whether it is still the same issue. However, if the maintenance team uses the Event Tracker and notes the repair was made, the analyst can investigate whether the repair did not fix the issue, the diagnosis/recommendation was incorrect, or there is another underlying issue. Along the same lines, if the maintenance team defers a work order (noting the repair will take place at the next outage), the analyst will know that the detected issue is the same issue diagnosed the previous month and that repairs are slated. However, if the subsequent month shows rapid degradation, the analyst may contact the maintenance team to let them know that the repair may not be able to wait until the scheduled maintenance.

Several example embodiments of the present general inventive concept include enhanced information exchange, including voice or sound recordings, photos, and video recordings along with predefined notes and freeform notes which can easily be assigned to a component and/or a location on the component; this was not previously available because vibration analyzers did not have this sophistication.

In various embodiments, complex notes can be transferred in both directions between the analyst and the field technician and must be acknowledged before either party can perform his typical required activities. Notes can be prioritized to ensure that they are addressed with proper urgency which is captured by the software exchange process and generates immediate emails to the analyst and the diagnostic center administrator. Predefined Notes can be automatically acted upon by the automated analysis software in the diagnostic center to supplement the analysis of the test data and such action can generate recommended actions in the diagnostic report for the machine. The status of the machine and its latest diagnostic report is automatically transmitted for each machine to trigger the field technician to pay closer attention to a machine of heightened concern.

In various embodiments, additional measurements generated by the field technician automatically generate notes to the analyst because this data will not automatically be processed by the automated diagnostic software but may be very important to determining the correct diagnosis and recommendations. The presence of any additional special test measurements is automatically logged as a part of the complex note created for the machine. The presence of these special tests must be acknowledged by the analyst before he can complete his analysis of this machine.

Several example embodiments of the present general inventive concept comprise a vibration analyzer that supports complex notes from selections of predefined list of conditions of significance, free text descriptions, voice and/or sound recordings, and photographs or video recording identified with specific components or locations on or near the machine. In several embodiments, a vibration analyzer is capable of receiving machine-specific requested actions or tasks, with acknowledgement by the field technician required before new data can be collected. In general, several example embodiments include vibration analyzers that support the generation of complex notes related to any special test measurements which are collected.

The present general inventive concept may be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, flash drives, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that the simplified diagrams and drawings do not illustrate all the various connections and assemblies of the various components, however, those skilled in the art will understand how to implement such connections and assemblies, based on the illustrated components, figures, and descriptions provided herein.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A vibration data analysis and communication system to analyze vibration measurements from a plurality of machines located along a route of machines to be tested based on vibration signals detected by a sensor according to one or more measurement tests, the system comprising:

a data acquisition unit configured to receive vibration signals from a sensor attached to a machine-under-test, and to process the vibration signals to generate vibration data;

an input unit configured to receive an input of field notes information from an operator of the input unit, the field notes information being related to one or more observed fault conditions of the machine-under-test observed by the operator of the input unit during the one or more measurement tests, the input unit being configured to incorporate the field notes information into the vibration data such that the vibration data is linked to the one or more observed fault conditions;

a communication unit configured to transmit the vibration data and field notes information to a remote diagnostic unit over a communication network once vibration data has been acquired from each machine along the route such that transmitted vibration data and field notes information are placed in a data processing queue to be reviewed by a remote analyst having access to the remote diagnostic unit during a subsequent period after all machines on the route have been tested by the operator; and a control unit to control operations of the sensor, the data acquisition unit, the input unit, and the communication unit.

2. The system of claim 1, wherein the remote diagnostic unit is configured to alert the remote analyst to presence and priority of newly received vibration data, and wherein the remote diagnostic unit contains:

an expert system which may be run on demand or automatically; and a maintenance health report generator to generate maintenance reports of tested machines, to alert the remote analyst to presence of one or more of field notes information, additional test data, and recent maintenance reports, and to prompt the remote analyst to input an acknowledgement to confirm that field notes information has been reviewed before a maintenance report can be finalized.

3. The system of claim 1, wherein the field notes information includes priority flags which trigger the remote diagnostic unit to alert the remote analyst to review the received vibration data on a priority basis.

4. The system of claim 1, wherein the control unit includes an expert system to screen the vibration data to identify one of more faults in the vibration data based on the field notes information.

5. The system of claim 1, wherein the subsequent period occurs a number of days after all machines on the route have been tested.

6. The system of claim 1, wherein the transmitted vibration data and field notes information includes a flag indicating presence of field notes information related to one or more machines along the route.

7. The system of claim 1, wherein the input unit is configured as an integrated hand-held device having a menu display to structure a plurality of predefined notes into one or more predetermined categories of specific fault conditions, and to display a list of components related to a specific fault condition such that the operator can select one or more predefined notes related to a predetermined category and can select one or more specific components related to the specific fault condition to be included in the field notes information.

8. The system of claim 7, wherein the menu display is configured to display a plurality of locations on the machine-under-test such that the operator can select a location on the machine associated with the one or more specific components and/or the specific fault condition to be included in the field notes information.

9. The system of claim 8, wherein the menu display includes one or more priority flags such that the operator can select a priority flag to prioritize review of the field notes information by the remote analyst.

10. The system of claim 1, wherein the input unit is configured to receive observations from the operator via one or more of a predefined note and a typed or handwritten free-text note.

11. The system of claim 10, wherein the one or more of a predefined note and typed or handwritten free-text note includes an identification number to identify the one or more suspected faults.

12. The system of claim 1, wherein the remote diagnostic unit includes a remote control unit configured to receive inputs from the remote analyst to control operation of the data acquisition unit and input unit.

13. The system of claim 12, wherein the remote control unit is configured to communicate a requested action from the remote analyst to the operator regarding where to position the sensor on the machine-under-test.

14. The system of claim 1, wherein the remote diagnostic unit is configured to communicate a requested action from the remote analyst to the operator instructing the operator to collect supplemental information relevant to the health of the machine-under-test.

15. The system of claim 14, wherein the control unit instructs the operator to record maintenance status information of one or more previously recommended requested actions, and to transmit an instruction to the remote analyst via the remote diagnostic unit to review the maintenance status information before a maintenance report is generated.

16. The system of claim 15, wherein the remote diagnostic unit is configured to prompt the remote analyst to input an acknowledgment to confirm the maintenance status information has been reviewed.

17. The system of claim 1, wherein the control unit includes an expert system to screen the vibration data to identify one of more machine faults based on the vibration data, and to recommend one or more additional test measurements to the operator based on the one or more identified machine faults.

18. The system of claim 17, wherein:

the input unit is configured to present the operator with a list of predefined additional tests from which the operator can select the one or more additional tests to be performed;

the control unit is configured to control the sensor to detect additional vibration signals from the machine-under-test according to one or more selected additional tests; and the data acquisition unit is configured to receive and processes the additional vibration signals to generate additional vibration data according to the one or more selected additional tests.

19. The system of claim 18, wherein the expert system is configured to screen the additional vibration data to determine whether the one or more identified machine faults are identified by the additional vibration data.

20. The system of claim 19, wherein the expert system recommends one or more corrective maintenance events based on a determination of whether the one or more identified machine faults are identified by the additional vibration data.

21. The system of claim 18, wherein the input unit is configured to receive one or more inputs from the operator to instruct the control unit to perform a particular selected additional test using predefined and/or customizable test parameters chosen by the operator.

22. The system of claim 21, wherein the control unit is configured to add special tests to the list of special test measurements according to inputs from the remote analyst and/or operator.

23. The system of claim 1, wherein the input unit is configured as an integrated hand-held device to selectively receive an input of the field notes information using one or more of a voice recording, a photograph, a sound recording, and a video recording captured using the hand-held device.

24. The system of claim 23, wherein the field notes information is derived from a physical inspection and is configured to identify the one or more observed fault conditions at one or more locations regarding one or more machinery components with normal or enhanced priority, the enhanced priority being based on one or more of photographs, audio and video recordings captured by the operator by pointing and clicking the hand-held device.

25. The system of claim 24, wherein the communication unit is configured to receive feedback from the remote analyst including a request for the operator to conduct additional tests based on one or more suspected faults of the machine-under-test, and wherein the field notes information includes data generated automatically by the input unit identifying a particular additional test performed, a particular machinery component tested, a location of the particular machinery component tested, and/or a time when the particular additional test was performed.

26. The system of claim 25, wherein the input unit is configured to prompt the operator to input an acknowledgement to confirm receipt of the request to conduct additional tests before routine measurement tests can be performed.

27. The system of claim 26, wherein the control unit is configured to instruct the communication unit to transmit the acknowledgment to the remote diagnostic unit.

28. The system of claim 25, wherein the communication unit is configured to generate a real-time conference between the remote analyst and the operator by voice and/or video, to exchange test setup or test data files, and to receive instructions from the remote analyst and/or operator to execute the additional tests.

29. The system of claim 28, wherein the communication unit includes a camera and a microphone configured to facilitate the real-time conference between the remote analyst and the operator.

30. The system of claim 29, wherein the communication unit is configured such that the remote analyst and the operator of the data acquisition unit jointly perform a machine test and view test results.

31. A method of vibration data analysis to analyze vibration measurements from a plurality of machines located along a route of machines to be tested based on vibration signals detected by a sensor according to one or more measurement tests, the method comprising:
receiving, at a data acquisition unit, vibration signals from a sensor attached to the machine-under-test, and processing the vibration signals to generate vibration data;
receiving an input of field notes information from an operator of an input unit, the field notes information being based on one or more observed fault conditions of the machine-under-test observed by the operator of the input unit during the one or more measurement tests;
incorporating the field notes information into the vibration data such that the vibration data is linked to the one or more observed fault conditions;
transmitting, with a communication unit, the vibration data and field notes information to a remote diagnostic unit over a communication network once vibration data has been acquired from each machine along the route such that transmitted vibration data and field notes information are placed in a data processing queue to be reviewed by a remote analyst having access to the remote diagnostic unit during a subsequent period after all machines on the route have been tested by the operator, wherein the remote analyst will analyze the vibration data and field notes information and document any of the one or more observed fault conditions related to the plurality of machines that were tested; and
controlling operations of the sensor, the data acquisition unit, the input unit, and the communication unit with a control unit,
wherein an integrated hand-held device is used as the input unit to receive the field notes information from the operator via one or more of a voice recording, a photograph, a sound recording, and a video recording.

32. The method of claim 31, wherein the communication unit is configured to transmit feedback from the remote analyst to the field technician including instructions to perform additional tests on the machine-under-test.

33. The method of claim 31, further comprising prompting the remote analyst to input an acknowledgment to confirm the field notes information has been reviewed before a diagnostic report can be generated.

34. A vibration data analysis and communication system to analyze vibration measurements from a plurality of machines located along a route of machines to be tested based on vibration signals detected by a sensor according to one or more measurement tests, the system comprising:
a data acquisition unit configured to receive vibration signals from a sensor attached to the machine-under-test, and to process the vibration signals to generate vibration data;
an input unit configured to receive an input of field notes information from an operator of the input unit, the field notes information being related to one or more observed fault conditions of the machine-under-test observed by the operator of the input unit during the one or more measurement tests, the input unit being configured to incorporate the field notes information into the vibration data such that the vibration data is linked to the one or more observed fault conditions;
a communication unit configured to generate a real-time conference between the remote analyst and the operator over a wireless or cellular information network, to exchange voice or video messages between the remote analyst and the operator, to exchange test setup or test data files between the remote analyst and the operator, and to receive instructions from the remote analyst and/or the operator to execute functions of the input unit and/or data acquisition unit.

35. The system of claim 34, further comprising a remote control unit configured to communicate a requested action from the remote analyst to the operator regarding where to position the sensor on the machine-under-test.

36. The system of claim 35, wherein the requested action includes an instruction from the remote analyst to the operator to perform an additional test, to find design information regarding the machine-under-test, or to perform a specific inspection task.

37. The system of claim 34, wherein the field notes information and the vibration data are combined to form an assembled data packet associated with a particular machine-under-test.

38. The system of claim 34, wherein the input unit is configured as an integrated hand-held device with a camera and microphone to capture observation data including one or more of a voice recording, a photograph, a sound recording, and a video recording, and to transmit captured observation data to the remote analyst over the information network such that the remote analyst can see and hear what the operator is observing.

39. The system of claim 34, wherein the communication unit is configured such that the remote analyst and the operator of the data acquisition unit jointly perform a machine test and view test results.

40. The system of claim 34, wherein the communication unit is configured to transmit linked vibration data and field notes information to a remote analyst over a communication network, and to receive feedback from the remote analyst via the communication network regarding health of the machine-under-test based on incorporated field notes information and vibration data.

\* \* \* \* \*